United States Patent
Ton-That et al.

(10) Patent No.: US 9,175,147 B2
(45) Date of Patent: Nov. 3, 2015

(54) FIRE-RESISTANT CELLULOSIC MATERIAL

(75) Inventors: Minh-Tan Ton-That, Montreal (CA); Tri-Dung Ngo, Laval (CA); Johanne Denault, Longueuil (CA); Christian Belanger, Boucherville (CA); Wei Hu, Longueuil (CA)

(73) Assignee: National Research Council of Canada, Ottawa, Ontario (CA)

( * ) Notice: Subject to any disclaimer, the term of this patent is extended or adjusted under 35 U.S.C. 154(b) by 0 days.

(21) Appl. No.: 14/128,332

(22) PCT Filed: Jul. 4, 2012

(86) PCT No.: PCT/CA2012/000631
§ 371 (c)(1),
(2), (4) Date: Dec. 20, 2013

(87) PCT Pub. No.: WO2013/003944
PCT Pub. Date: Jan. 10, 2013

(65) Prior Publication Data
US 2014/0121306 A1    May 1, 2014

Related U.S. Application Data

(60) Provisional application No. 61/504,779, filed on Jul. 6, 2011.

(51) Int. Cl.
*C08G 18/38* (2006.01)
*C08K 3/34* (2006.01)
(Continued)

(52) U.S. Cl.
CPC . *C08K 3/28* (2013.01); *C08B 15/10* (2013.01); *C08K 3/10* (2013.01); *C08K 3/16* (2013.01);
(Continued)

(58) Field of Classification Search
CPC ......... C08B 15/10; C08L 73/00; C08L 63/00; C08L 67/06; C08L 61/06; C08L 97/02; C08L 33/04; C08L 23/12; C08K 3/28; C08K 3/22; C08K 3/10; C08K 3/16; C08K 21/02; D06M 11/38; D06M 11/155; D06M 11/17; D06M 11/36
USPC ............................................. 524/445, 35, 447
See application file for complete search history.

(56) References Cited

U.S. PATENT DOCUMENTS

| 671,548 A | 4/1901 | Gordon |
| 2,428,843 A | 10/1947 | Georges et al. |

(Continued)

FOREIGN PATENT DOCUMENTS

| CA | 2079302 | 3/1994 |
| CN | 1869154 | 11/2006 |

(Continued)

OTHER PUBLICATIONS

IPRP for corresponding PCT Application No. PCT/CA2012/000631 mailed Jan. 7, 2014.

(Continued)

*Primary Examiner* — William Cheung
(74) *Attorney, Agent, or Firm* — Catherine Lemay

(57) ABSTRACT

A new approach for improving fire resistance of cellulosic materials is provided, especially when the cellulosic material is to be used in polymer composites. Cellulosic material is treated with an aqueous mixture of alkali metal or ammonium hydroxide and alkaline earth or aluminum metal salt simultaneously with or within a short period of time of preparing the mixture. The treated cellulosic material becomes self-extinguishing and may also have improved thermal stability, improved interfacial thermal resistance, improved resistance to damage by oxidants and other chemical agents, improved resistance to biological agents and/or improved resistance to damage by ultra-violet light.

21 Claims, 1 Drawing Sheet

(51) Int. Cl.

| | | |
|---|---|---|
| *C09C 1/42* | (2006.01) | |
| *C08K 9/04* | (2006.01) | |
| *C08K 3/28* | (2006.01) | |
| *C08B 15/10* | (2006.01) | |
| *C08L 61/06* | (2006.01) | |
| *C08L 63/00* | (2006.01) | |
| *C08L 67/06* | (2006.01) | |
| *C08K 3/16* | (2006.01) | |
| *D06M 11/155* | (2006.01) | |
| *D06M 11/17* | (2006.01) | |
| *D06M 11/36* | (2006.01) | |
| *D06M 11/38* | (2006.01) | |
| *C08K 3/10* | (2006.01) | |
| *C08K 3/22* | (2006.01) | |
| *C08L 23/12* | (2006.01) | |
| *C08L 33/04* | (2006.01) | |
| *C08L 73/00* | (2006.01) | |
| *C09K 21/02* | (2006.01) | |

(52) U.S. Cl.
CPC . *C08K 3/22* (2013.01); *C08L 23/12* (2013.01); *C08L 33/04* (2013.01); *C08L 61/06* (2013.01); *C08L 63/00* (2013.01); *C08L 67/06* (2013.01); *C08L 73/00* (2013.01); *D06M 11/155* (2013.01); *D06M 11/17* (2013.01); *D06M 11/36* (2013.01); *D06M 11/38* (2013.01); *C09K 21/02* (2013.01)

(56) References Cited

U.S. PATENT DOCUMENTS

| | | | |
|---|---|---|---|
| 2,990,232 | A | 6/1961 | Pacsu et al. |
| 3,018,206 | A | 1/1962 | Hood et al. |
| 3,620,912 | A | 11/1971 | Beelik et al. |
| 3,899,483 | A | 8/1975 | Le Blanc |
| 3,973,074 | A | 8/1976 | de Lissa et al. |
| 4,064,317 | A | 12/1977 | Fukuba et al. |
| 4,228,202 | A | 10/1980 | Tjannberg |
| 4,317,752 | A | 3/1982 | Blount |
| 4,317,769 | A | 3/1982 | Saito et al. |
| 4,421,815 | A | 12/1983 | Briggs et al. |
| 4,567,242 | A | 1/1986 | Nishibori et al. |
| 4,731,265 | A | 3/1988 | Hirao |
| 5,238,464 | A | 8/1993 | Johnson et al. |
| 5,434,200 | A | 7/1995 | Kolker et al. |
| 5,480,587 | A | 1/1996 | Musselman et al. |
| 6,352,786 | B2 | 3/2002 | Arshinova et al. |
| 6,521,689 | B1 | 2/2003 | Yabuhara et al. |
| 6,524,653 | B1 | 2/2003 | Jones |
| 6,946,578 | B2 | 9/2005 | Nakano et al. |
| 8,308,997 | B2 | 11/2012 | Schubert |
| 2003/0220515 | A1 | 11/2003 | Yoshifumi et al. |
| 2004/0094279 | A1 | 5/2004 | Myatt |
| 2005/0215152 | A1 | 9/2005 | Ahluwalia |
| 2006/0234592 | A1 | 10/2006 | Mio et al. |
| 2008/0234423 | A1* | 9/2008 | Wang et al. .......... 524/445 |
| 2009/0104458 | A1* | 4/2009 | Ryu .......................... 428/446 |
| 2009/0298370 | A1 | 12/2009 | Rock |

FOREIGN PATENT DOCUMENTS

| | | |
|---|---|---|
| EP | 0522304 | 1/1993 |
| EP | 0735187 | 10/1996 |
| GB | 2367064 | 3/2002 |
| JP | S62116106 | 5/1987 |
| JP | 2002180374 | 6/2002 |
| JP | 2003-020596 | 1/2003 |
| WO | WO0244470 | 6/2002 |
| WO | WO2005042840 | 5/2005 |

OTHER PUBLICATIONS

ISR and WO for corresponding PCT Application No. PCT/CA2012/000631 mailed Sep. 26, 2012.
Chen Y, Frendi A, Tewari S, Sibulkin M. (1991) Combustion Properties of Pure and Fire-Retarded Cellulose. Combustion and Flame. 84, 121-140.
Mostashari SM. (2004-2005) The Impartation of Flame-Retardancy to Cotton Fabric by the Application of Selected Carbonates of Group II. J. Applied Fire Science. 13(1), 1-8.
Mostashari SM, Kamali Nia Y, Fayyaz F. (2008) Thermogravimetry of Deposited Caustic Soda Used as a Flame-Retardant for Cotton Fabric. Journal of Thermal Analysis and Calorimetry. 91(1), 237-241.
Mostashari S.M. et al., Burning of a cotton fabric impregnated by synthetic zinc carbonate hydroxide as a flame retardant, Combustion, Explosion, and Shock Waves, vol. 41, No. 4, pp. 426-429, 2005.
Thunwall M. et al, Processing and properties of Mineral-Interfaced Cellulose Fibre Composites, Journal of Applied Polymer Science, V. 107, Issue 2, 2008, pp. 918-929.
Lindstrom T. et al., Nanoclay plating of cellulosic fiber surfaces, Journal of Applied Polymer Science, vol. 108, Issue 2, 2008, pp. 887-891.
European Search Report issued by the European Patent Office in respect of corresponding EP Application No. 12807430.9 on Mar. 31, 2015.
English Abstract for JPS62116106.
English Abstract for JP2003-020596.

* cited by examiner

FIRE-RESISTANT CELLULOSIC MATERIAL

CROSS-REFERENCE TO RELATED APPLICATIONS

This application is a national phase entry of International Patent Application No. PCT/CA2012/000631 filed Jul. 4, 2012 and claims the benefit of U.S. Provisional Patent Application Ser. No. USSN 61/504,779 filed Jul. 6, 2011, the entire contents of both of which are herein incorporated by reference.

FIELD OF THE INVENTION

The present invention relates to a process for producing a fire-resistant cellulosic material, the fire-resistant cellulosic material produced by the process and the use of the fire-resistant cellulosic material in fire-resistant polymer composites.

BACKGROUND OF THE INVENTION

Cellulosic materials (natural and synthetic) in different forms (fiber, film, powder, particle, pellet, chip, etc) at different sizes (nano, micro or macro) are often flammable and have low thermal resistance. They can be burned and also can spread the fire in the presence of oxygen. Thus, their use either in direct or non-direct form is limited in applications requiring fire resistance. Due to their flammability, the use of cellulosic materials in polymer composites is also limited in certain applications.

Cellulosic materials are treated with different flame retardants depending on the application, for example in furniture, textiles or composites. The most commonly used flame retardants are based on halogen (e.g. WO 2004/1097088), phosphorous (e.g. U.S. Pat. Nos. 3,899,483; 6,524,653; 4,228,202; 5,238,464; US 2005/0215152; US 2004/0094279; WO 2002/1044470; U.S. Pat. No. 6,352,786), boron (e.g. WO 2005/1042840; U.S. Pat. No. 4,228,202; US 2009/0156073), ammonium (e.g. U.S. Pat. Nos. 4,228,202; 6,524,653; WO 2002/1044470), graphite (e.g. JP 09-031887; EP 0735187), alkaline-earth metallic compounds (e.g. U.S. Pat. No. 5,434,200) or mixtures thereof. To improve fire resistance of organic polymer composites, the incorporation of flame retardants based on halogen, phosphorous, metallic hydroxide (magnesium hydroxide, aluminum hydroxide, calcium hydroxide, layer double hydroxide), metallic oxide (antimony oxide, boron oxide), silicate (clay, talc), etc, in the polymer matrix has been widely used.

Among the compounds listed above, halogen based flame retardants are well known to be the most efficient as they can be used at a low concentration in the final composition thus limiting their impact on other properties of the product. However, halogen compounds are considered to be harmful to the environment. Boron compounds are supposed to be efficient, however they tend to be washed off due to their good solubility in water. Less harmful flame retardants based on phosphorous, graphite or alkaline-earth metallic compounds are much less efficient, thus a large amount of those additives must be used in the formulation. The use of flame retardant incorporated in a polymer matrix alone does not satisfactorily resolve the flammability problem in cellulose-polymer composites, especially when the concentration of cellulose is quite significant in the formulation of the composite.

It is generally known that metal hydroxides, including barium hydroxide, can be used as a flame retardant for cellulosic materials (e.g. US 2009-298370; U.S. Pat. No. 671,548; Chen 1991; Mostashari 2008) and for polymer materials (e.g. U.S. Pat. No. 7,354,958). Further, CA 2,079,302 discloses a flame retardant composition for cellulosic material comprising sodium hydroxide and a metal salt of boron among other ingredients. The metal salt of boron is defines as borax which is a sodium tetraborate. U.S. Pat. No. 3,973,074 discloses a flame-proofing composition comprising potassium hydroxide and/or potassium carbonate and possible a small amount of sodium hydroxide and/or sodium carbonate and may include another potassium salt. U.S. Pat. No. 5,480,587 discloses inorganic additives to impart flame resistance to polymers. The additives include hydroxides and metal salts that evolve gas. One such metal salt is barium chloride dihydrate. U.S. Pat. No. 4,567,242 discloses the use of a mixture of a polycondensate of a halogenated phenol and an alkaline earth metal halide in a flame retarding composition.

US 2003-0220515 discloses flame retardant compositions in which ancillary flame retardant additives may be used alone or in combination, such as metal hydroxides and metal salts, including alkaline earth metal salts. There is no disclosure of the use of an aqueous mixture of alkali metal hydroxides with alkaline earth metal salts.

U.S. Pat. No. 4,064,317 discloses the use of "alkali compounds" for use in flame resistant plaster board. The "alkali compounds" are defined as at least one of an alkali metal hydroxide, alkali metal salt, alkaline earth metal hydroxide or alkaline earth metal salt. It is preferred to use a mixture of alkali metal salts and alkaline earth metal salts, for example a mixture of sodium and calcium formate. The combination of alkali metal hydroxide and alkaline earth metal salt, especially barium salts, is not specifically disclosed.

The abstract of CN 1869154 discloses a flame retardant composition which initially involves the step of making magnesium hydroxide from the reaction of magnesium sulfate and sodium hydroxide. However, this document does not disclose treating a cellulosic material with an aqueous reaction mixture of an alkali metal hydroxide and alkaline earth metal salt simultaneously with or shortly after mixing the alkali metal hydroxide with alkaline earth metal salt.

It is known that treatment of cellulosic materials with alkaline earth metal carbonates (e.g. barium carbonate) imparts fire resistance to the cellulosic material (e.g. Mostashari 2004-2005). Here, the alkaline earth metal carbonate is applied to the cellulosic material by first coating the cellulosic material with an alkaline earth metal chloride and then treating the so-coated material with sodium carbonate. It is also known to use both a clay and a metal hydroxide in a fire retarding composition comprising a polymer material (e.g. GB 2367064; JP 2002-180374).

There remains a need for an environmentally friendlier, effective approach to producing fire-resistant cellulosic materials.

SUMMARY OF THE INVENTION

The present invention provides a new approach for improving fire resistance of cellulosic materials, especially when the cellulosic material is to be used in polymer composites. Cellulosic material is treated with an aqueous mixture of alkali metal or ammonium hydroxide and alkaline-earth or aluminum metal salt simultaneously with or within a short period of time of preparing the mixture. The treated cellulosic material becomes self-extinguishing and may also have improved thermal stability, improved interfacial thermal resistance, improved resistance to damage by oxidants and other chemical agents, improved resistance to damage by ultra-violet light and/or reduced negative impact on fiber strength and/or modulus. The fire-resistant cellulosic material may also be treated with a layered nanoparticulate material either simultaneously with, subsequent to or prior to treatment with the aqueous mixture of alkali metal or ammonium hydroxide and alkaline-earth or aluminum metal salt to impart further fire resistance to the cellulosic material. Polymer composites produced from cellulosic material treated according to the present invention have significantly improved fire resistance with small negative impact on the mechanical performance of the composite, and may have the added benefit of one or more of improved thermal stability, improved interfacial thermal resistance, improved resistance to damage by oxidants and other chemical agents and improved resistance to damage by ultra-violet light.

Thus, in one aspect of the present invention there is provided a process of producing a fire-resistant cellulosic material comprising: treating a cellulosic material with an aqueous reaction mixture of an alkali metal or ammonium hydroxide and an alkaline earth or aluminum metal salt, wherein the treating is done simultaneously with or within a short period of time of mixing the alkali metal or ammonium hydroxide and alkaline earth metal or aluminum salt; and, drying the treated cellulosic material.

In another aspect of the present invention there is provided a fire-resistant cellulosic material produced by the process of the present invention.

In yet another aspect of the present invention there is provided a polymer composite comprising a polymer matrix and the fire-resistant cellulosic material of the present invention dispersed in the polymer matrix.

Alkali metal hydroxides are the hydroxides of Group IA metallic elements and include, for example, lithium hydroxide, sodium hydroxide, potassium hydroxide and cesium hydroxide. Sodium hydroxide and potassium hydroxide are particularly preferred, especially sodium hydroxide. Ammonium hydroxide is $NH_4OH$. The alkali metal or ammonium hydroxide will be referred to herein as the hydroxide. The hydroxide is preferably present in the aqueous reaction mixture in an amount of about 20 wt % or less, based on weight of the reaction mixture. More preferably, the amount is in a range of from about 0.1 wt % to about 10 wt %. Even more preferably, the amount is in a range of from about 0.5 wt % to about 4 wt %.

Alkaline earth metal salts or aluminum metal salts, or mixtures thereof are used in conjunction with the alkali metal salts to produce the fire-resistant cellulosic material. Alkaline earth metal salts and aluminum metal salts are ionic compounds that dissociate in an aqueous environment and comprise one or more cations and one or more counter anions. Alkaline earth metal salts are preferred. Alkaline earth metals include, for example, beryllium, magnesium, calcium, strontium and barium. Magnesium, calcium and barium are particularly preferred, especially magnesium and calcium. Counter anions may be any suitable negatively charged elements or radicals or combinations thereof. Counter anions include, for example, halides (e.g. fluoride, chloride, bromide, iodide), nitrate and sulfate. Chloride and nitrate are particularly preferred. Chloride is most preferred. The alkaline earth metal or aluminum salt is preferably present in the aqueous reaction mixture in an amount of about 20 wt % or less, based on weight of the reaction mixture. More preferably, the amount is in a range of from about 0.1 wt % to about 15 wt %. Even more preferably, the amount is in a range of from about 0.5 wt % to about 10 wt %.

In addition the ratio between the hydroxide and alkaline earth or aluminum metal salt can play an important role. The molar ratio between the hydroxide and the alkaline earth or aluminum metal salts is preferably in a range of from about 0.2 to about 4. More preferably, the molar ratio is in a range of from about 0.5 to about 2. The ratio between the hydroxide and alkaline earth or aluminum metal salt can also be expressed on a weight basis, and is preferably in a range of from about 0.9 wt % to about 1.1 wt %.

In addition, the concentration of the product of the aqueous reaction mixture of the hydroxide and the alkaline earth or aluminum metal salt is preferably about 0.5 wt % or more, more preferably about 1.5 wt % or more, even more preferably in a range of from about 1.5 wt % to about 20 wt %, yet more preferably about 1.5 wt % to about 15 wt %, based on weight of the reaction mixture.

Treating the cellulosic material with the aqueous reaction mixture is preferably done simultaneously with mixing the hydroxide and alkaline earth or aluminum metal salt. However, the reaction mixture remains effective within a short period of time of mixing. The maximum desirable length of time after mixing and before treating is 1 day, preferably 5 hours or less, more preferably 5 seconds to 5 hours. More preferably, the time is in a range of from about 5 seconds to about 30 minutes, or about 5 seconds to about 10 minutes, or about 30 seconds to about 24 hours, or about 1 minute to about 5 hours.

The cellulosic material may be obtained from any suitable source. Cellulosic materials may be natural or synthetic, may have different forms (e.g. fiber, shives, film, powder, particle, pellet, chip, etc.) and may have different size distributions (e.g. nano, micro or macro). Some suitable sources of cellulosic include, for example, wood sources (e.g. pulp, wood flour such as sawdust, wood shavings, etc. from softwood and/or hardwood, etc), agricultural sources (e.g. fruits, grain crops (e.g. triticale and flax), vegetables, cotton, hemp, grass, rice straw, etc.), synthetic sources (e.g. nanocrystalline cellulose, cellulose triacetate, cellulose propionate, cellulose acetate propionate, cellulose acetate butyrate, nitrocellulose, cellulose sulfate, methylcellulose, ethylcellulose, ethyl methyl cellulose, hydroxypropyl cellulose, hydroxyethyl methyl cellulose, hydroxypropyl methyl cellulose, carboxymethyl cellulose, etc.), recycled paper and cardboard. The cellulosic material may be used alone or mixed with cellulosic materials from different sources. It is apparent to one skilled in the art that cellulosic materials from natural sources, for example wood and vegetable fibers, contain significant amount of lignin (in some case more than 30 wt %) and that such "lignocellulose materials" are encompassed by the present invention. A particularly preferred form are cellulosic material is fibers. For use in polymer composites, non-fibrous cellulosic material having an average particle size of from about 0.001-20 mm, more particularly from about 0.01-5 mm are generally suitable. Non-fibrous cellulosic material may be in the form of cellulosic nanocrystals. When the cellulosic material is fibrous, the average diameter of the fiber is preferably in a range of from about 0.001 micron to 400 micron, more preferably from about 0.001 to 100 micron. Fibrous cellulosic material may be in the form of cellulosic nanofibers or nanowhiskers.

After treating with the aqueous reaction mixture, treated cellulosic material is dried to produce fire-resistant cellulosic material of the present invention. Prior to drying, the treated cellulosic material may be cleaned, for example with water, if desired or required. Drying may be done by any suitable method, for example, air drying at ambient temperature and pressure, drying at elevated temperature, drying under a pressurized stream of air or other gas or a combination thereof. Specialized equipment such as fluid bed, rotary, spray and vacuum dryers may be used.

To further improve fire resistance of the cellulosic material, the cellulosic material may be further treated with a layered nanoparticulate material. Treating the cellulosic material with the layered nanoparticulate material may be done before, at the same time as or after treating the cellulosic material with the aqueous reaction mixture. Preferably, the cellulosic material is treated with layered nanoparticulate material after treatment with the aqueous reaction mixture as this leads to a more durable fire-resistant coating. This further treatment with layered nanoparticulate material is particularly useful when the fire-resistant cellulosic material is to be used in a polymer composite as it significantly improves the fire-resistance of the composite in comparison to using fire-resistant cellulosic material that has only undergone treatment with the aqueous reaction mixture.

Any suitable layered nanoparticulate material may be used. Layered clays are particularly preferred. Layered clays are hydrated aluminum or aluminum-magnesium silicates comprised of multiple platelets. Layered clays may be natural, semi-synthetic or synthetic layered silicates. Suitable layered clays include, for example, bentonite, kaolinite, dickite, nacrite, stapulgite, illite, halloysite, montmorillonite, sepiolite, palygorskite, hectorite, fluorohectorite, nontronite, beidellite, saponite, volkonskoite, magadiite, medmontite, kenyaite, sauconite, muscovite, vermiculite, mica, fluoromica, hydromica, phegite, brammalite, celadonite, layered double hydroxides, etc., or a mixture thereof. Particularly preferred are layered double hydroxides, montmorillonite, sepiolite, palygorskite, bentonite, fluoromica or a mixture thereof. Layered double hydroxides, montmorillonite or mixtures thereof are even more particularly preferred. The layered nanoparticulate material is used in a sufficient amount to provide an improvement to the fire-resistance of the cellulosic material or composite in which the cellulosic material is used. The layered nanoparticulate material is preferably present in the aqueous mixture in an amount of about 15 wt % or less, based on weight of the mixture. More preferably, the amount is in a range of from about 0.1 wt % to about 10 wt %. Even more preferably, the amount is in a range of from about 0.5 wt % to about 5 wt %.

The cellulosic material may be mixed with the aqueous mixture, and layered nanoparticulate material if desired, in any suitable way known in the art. Various systems are known in the art and include, for example, high shear mixers, in-line mixers, batch mixers, colloid mills, stirrers, agitators and blending systems.

A polymer composite of the present invention comprises the fire-resistant cellulosic material dispersed in a polymer matrix. The polymer matrix may comprise one or more suitable organic or inorganic polymers, preferably one or more organic polymers. Organic polymers may be natural or synthetic and may be obtained from non-renewable or renewable sources. Natural polymers include cellulose, lignin, starch, protein, etc. Polymer matrices may be classified in a number of other different ways. A suitable polymer matrix may comprise a homopolymer, a copolymer, a terpolymer, or a mixture thereof. The polymer matrix may comprise amorphous or crystalline polymers. The polymer matrix may comprise hydrophobic or hydrophilic polymers. The polymer matrix may comprise linear, branched, star, cross-linked or dendritic polymers or mixtures thereof. Polymer matrices may also be conveniently classified as thermoplastic, thermoset and/or elastomeric polymers. It is clear to one skilled in the art that a given polymer matrix may be classifiable into more than one of the foregoing categories.

Thermoplastic polymers generally possess significant elasticity at room temperature and become viscous liquid-like materials at a higher temperature, this change being reversible. Some thermoplastic polymers have molecular structures that make it impossible for the polymer to crystallize while other thermoplastic polymers are capable of becoming crystalline or, rather, semi-crystalline. The former are amorphous thermoplastics while the latter are crystalline thermoplastics. Some suitable thermoplastic polymers include, for example, olefinics (i.e., polyolefins), vinylics, styrenics, acrylonitrilics, acrylics, cellulosics, polyamides, thermoplastic polyesters, thermoplastic polycarbonates, polysulfones, polyimides, polyether/oxides, polyketones, fluoropolymers, copolymers thereof, or mixtures thereof.

Some suitable olefinics (i.e., polyolefins) include, for example, polyethylenes (e.g., LDPE, HDPE, LLDPE, UHMWPE, XLPE, copolymers of ethylene with another monomer (e.g., ethylene-propylene copolymer)), polypropylene, polybutylene, polymethylpentene, or mixtures thereof. Some suitable vinylics include, for example, polyvinylchloride, chlorinated polyvinylchloride, vinyl chloride-based copolymers, polyvinylidenechloride, polyvinylacetate, polyvinylalcohol, polyvinyl aldehydics (e.g., polyvinylacetal), polyvinylalkylethers, polyvinylpyrrolidone, polyvinylcarbazole, polyvinylpyridine, or mixtures thereof. Some suitable styrenics include, for example, polystyrene, polyparamethylstyrene, polyalphamethylstyrene, high impact polystyrene, styrene-based copolymers, or mixtures thereof. Some suitable acrylonitrilics include, for example, polyacrylonitrile, polymethylacrylonitrile, acrylonitrle-based copolymers, or mixtures thereof. Some suitable acrylics include, for example, polyacrylicacid, polymethacrylicacid, polymethacrylate, polyethylacrylate, polybutylacrylate, polymethylmethacrylate, polyethylmethacrylate, cyanoacrylate resins, hydroxymethylmethacrylate, polacrylamide, or mixtures thereof. Some suitable cellulosics include, for example, cellulose, cellulose esters, cellulose acetates, mixed cellulosic organic esters, cellulose ethers, methylcellulose, ethylcellulose, carboxymethylcellulose, hydroxyethylcellulose, or mixtures thereof. Some suitable polyamides include, for example, aliphatic polyamides (i.e., nylons), aromatic polyamides, transparent polyamides, or mixtures thereof. Some suitable thermoplastic polyesters/polycarbonates are, for example, polyalkylene terephthalates (e.g., polyethylene terephthalate, polybutylene terephthalate), polycyclohexanedimethanol terephthalates, polyarylesters (e.g., polyarylates), polycaprolactones, polyactides, polyhydroxyalkanoates (e.g. polyhyroxybutanoate), polycarbonate, or mixtures thereof. Some suitable polysulfones include, for example, diphenylsulfone, polybisphenolsulfone, polyethersulfone, polyphenylethersulfones, or mixtures thereof. Some suitable polyimides include, for example, polyamideimide, polyetherimide, or mixtures thereof. Some suitable polyether/oxides include, for example, polymethyleneoxides, polyethyleneoxide, polypropyleneoxide, polyphenyleneoxides, or mixtures thereof. Some suitable polyketones include, for example, polyetheretherketone-1. Some suitable fluoropolymers include, for example, polytetrafluoroethylene, polychlorotrifluoroethylene, polyvinylfluoride, polyvinylidenefluoride, polyperfluoroalkoxy, polyhexafluoropropylene, polyhexafluoroisobutylene, fluoroplastic copolymers, or mixtures thereof.

Thermoset polymers (thermoset resins) generally arise from a complex combination of polymerization and cross-linking reactions, which convert low- or relatively low-molecular weight molecules into three-dimensional networks. The reaction is irreversible and the resulting polymeric species is generally hard. The polymerization and cross-linking reactions may be temperature-activated, catalyst-activated or mixing-activated. Some suitable thermosets include, for example, phenolic systems, formaldehyde systems, furan systems, allyl systems, alkyd systems, unsaturated polyester systems, vinylester systems, epoxy systems, urethane/urea systems, isocyanurate systems or mixtures thereof.

Some suitable phenolic systems include, for example, phenol-formaldehyde resins, phenol acetaldehyde resins, alkylphenol-formaldehyde resins, lignin formaldehyde resins or mixtures thereof. Some suitable formaldehyde systems include, for example, urea-formaldehyde resins, melamine-formaldehyde resins, phenol-formaldehyde resins, or mixtures thereof. Some suitable furan systems include, for example, furan resins, furfural resins, furfuryl alcohol resins, or mixtures thereof. Some suitable allyl systems include, for example, diallyl phthalate, diallyl isophthalate, diethyleneglycol bis(allyl carbonate), or mixtures thereof. Some suitable alkyd systems include, for example, the reaction product of ethylene glycol, glycerol and phthalic acid with fatty acids. Some suitable unsaturated polyester systems include, for example, one component which is a polyester product of a reaction between a difunctional acid or anhydride (e.g., maleic acid, maleic anhydride, phthalic anhydride, terephthalic acid) with a difunctional alcohol (e.g., ethylene glycol, propylene glycol, glycerol), and, a second component which is a monomer capable of polymerizing and reacting with unsaturations in the polyester component (e.g., styrene, alphamethylstyrene, methylmethacrylate, diallylphthalate). Some suitable vinylester systems include, for example, the reaction of diglycidyl ether of bisphenol A with methacrylic acid. Some suitable epoxy systems include, for example, the reaction between epichlorohydrin and a multifunctional acid, amine or alcohol. Some suitable urethane/urea systems include, for example, the reaction product of a liquid or solid isocyanate (e.g., 2,4-toluenediisocyanate, 2,6-toluenediisocyanate, methylene diisocyanate monomer or oligmer of different molecular weight) with a polyol (e.g., polyethylene ether glycol, polypropylene ether glycol).

Elastomeric polymers (elastomers) can generally be defined as materials capable of large elastic deformations and are often referred to as rubbers. Elastomers may be classified as vulcanizable elastomers, reactive system elastomers and thermoplastic elastomers. Some suitable elastomers include, for example, polyisoprene, polybutadiene, polychloroprene, polyisobutylene, styrene-butadiene rubber, acrylonitrile-butadiene rubber, ethylene-propylene rubber, ethylene-propylene-diene rubber, chlorinated polyethylene, chlorosulfonated polyethylene, ethylene-vinylacetate copolymer, ethylene-acrylate copolymer, fluoroelastomers (e.g., polyvinylidene fluoride, polychlorotrifluoroethylene), silicone polymers (e.g., polydimethylsiloxane), acrylic rubber, epichlorohydrin rubber, polysulfide rubbers, propyleneoxide rubbers, polynorbornene, polyorganophosphazenes, olefinic thermoplastic rubbers, styrenic thermoplastic rubbers, urethane thermoplastic rubbers, etherester thermoplastic rubbers, etheramide thermoplastic rubbers, copolymers of an elastomer, or mixtures thereof.

Particularly preferred polymer matrices include, for example, homopolymers and copolymers of PP, PE, PET, PBT, PHA, PHB, PLA, PA, PS, PVC, PVF, PVA, PVAc, polybutadiene, polychloroprene, polyisobutylene, styrene-butadiene rubber, acrylonitrile-butadiene rubber, ethylene-propylene rubber, ethylene-propylene-diene rubber, chlorinated polyethylene, chlorosulfonated polyethylene, ethylene-vinylacetate copolymer, ethylene-acrylate copolymer, phenolformladehyde, ligninformaldehyde, ureformaldehyde, melamine formaldehyde, epoxide, unsaturated polyester, vinylester, PU, polyisocyanurate, lignin, starch or mixtures thereof.

For thermoplastics, the number average molecular weight ($M_n$) of the polymer matrix may vary considerably depending on the specific type of polymer and the use to which the polymer composite is to be put. Preferably, the number average molecular weight is greater than about 500. Polymer matrices having a number average molecular weight of from about 1,300 to about 15,000,000 are suitable for a number of applications. In one embodiment, the number average molecular weight may be from about 1,500 to about 2,000,000. In another embodiment, the number average molecular weight may be from about 1,500 to about 500,000.

Compatibility of the fire-resistant cellulosic material with the polymer matrix in a composite may be improved by treating the fire-resistant cellulosic material with a surfactant. The surfactant may improve compatibility through primary or secondary interactions between the fire-resistant cellulosic material and the polymer matrix. Where a layered nanoparticulate material is also employed, the fire-resistant cellulosic material may be treated with the surfactant before or after, preferably after, treatment with the layered nanoparticulate material. Suitable surfactants for a given case will depend on the nature of the polymer matrix and the nature of the layered nanoparticulate material, if any, and are within the abilities of one skilled in the art to determine for any particular combination.

Surfactants generally comprise a functional group and a hydrocarbon chain. The functional group may be provided in the form of a positively charged ion (e.g. ammonium or phosphonium ions) or a negatively charged ion (e.g. carboxylate, sulfonate or phenolate) depending on the charge availability on the surface. The hydrocarbon chain preferably comprises 1 or more carbon atoms, more preferably from 6 to 20,000 carbon atoms, even more preferably from 10 to 40 carbon atoms. Hydrocarbon chains may be linear, branched or cyclic and may be substituted or unsubstituted. The surfactant may comprise one or more functional groups. The one or more functional groups interact with the clay surface and the polymer matrix and/or compatibilizer.

Some suitable surfactants include, for example, amines (e.g. dimethyldioctadecyl ammonium (DMDODA) salts, octadecyl amine (ODA) or its salts, trimethyloctadecyl ammonium salts, trimethylhexadecyl ammonium salts, dimethylhexadecyl amine or its salts, hexadecyl amine or its salts, dimethylbenzyloctadecyl ammonium salts, methyloctadecyldihydroxyethyl ammonium salts, methylamine or its salts, dimethylbenzyl amine or its salts, tribenzyl amine or its salts, glycine or its salts), di- and poly-functional amines (e.g. diethylenetriamine or its salts, ethylenediamine or its salts, Jeffamine™ T-403 or its salts, Jeffamine™ D-2000 or its salts), alkanolamines (e.g. ethanolamine or its salts, triethanolamine or its salts), acids or carboxylates (e.g. lauric acid, palmitic acid, stearic acid, stearate, oleic acid, oleate, linoleic acid, linoleate, ricinoleic acid) or mixtures thereof.

Polymer composites may also include other suitable additives normally used in polymers. Such additives may be employed in conventional amounts and may be added directly to the process during formation of the polymer composite. Illustrative of such additives known in the art are processing aid agents, colorants, pigments, carbon black, fibers (glass fibers, carbon fibers, aramid fibers), fillers, impact modifiers, antioxidants, stabilizers, flame retardants, reheat aids, crystallization aids, acetaldehyde reducing compounds, recycling release aids, oxygen scavengers, anti-UV agents, plasticizers, flexibilizers, nucleating agents, foaming agents, mold release agents, and the like, or their combinations.

The amounts of polymer matrix, fire-resistant cellulosic material and additives present in the polymer composite will depend on the particular use to which the polymer composite is put and the particular polymer matrix. The polymer matrix may be present in an amount from about 0.1 to about 99.9 weight percent based on the total weight of the polymer composite, or from about 20 to about 99 weight percent, or from about 40 to about 98 weight percent. The fire-resistant cellulosic material may be present in an amount from about 0.1 to about 99.9 weight percent based on the total weight of the polymer composite, or from about 1 to about 80 weight percent, or from about 10 to about 60 weight percent.

Standard polymer processing techniques may be used to prepare the polymer composites of the present invention. Such techniques are generally known in the art (Charrier 1991; Manas-Zloczower 1994; Rauwendaal 1998). Standard composite forming techniques may be used to fabricate products from the polymer composites of the present invention. For example, melt spinning, casting, vacuum molding, sheet molding, injection molding and extruding, melt blowing, spun bonding, blow molding, overmolding, compression molding, resin transfer molding (RTM), L-DFT, spraying, gel spinning, thermo-forming, roll-forming and co- or multilayer extrusion may all be used.

Advantageously, the process of the present invention is less harmful to the environment due to the absence of halogen compounds, organic solvents and toxic chemicals while the cellulosic materials treated according to the present invention pose less health risk to animals and human than boron and phosphorous compounds. Self-extinguishing cellulosic materials can be produced in accordance with the present invention using less harmful chemicals at significantly reduced concentrations. In addition, while the process involves the use of an aqueous mixture comprising a hydroxide and an alkaline earth or aluminum metal salt, and optionally a layered nanoparticulate material, fire resistance of the treated cellulosic material is not unduly compromised even after washing the fire-resistant cellulosic material several times with water, which is a significant advantage compared to other traditional water soluble flame retardants based on boron or phosphorous compounds. In addition, fire-resistant cellulosic material according to the present invention and their polymer composites may also have improved mechanical properties, improved thermal stability, improved interfacial thermal resistance, improved resistance to damage by oxidants and other chemical agents, improved resistance to biological agents (e.g. bacteria, mold, fungi, termites and other insects) and/or improved resistance to damage by ultra-violet light. Overall, the present invention provides several improvements to fire-resistant cellulosic materials and their polymer composites, which have not been realized before.

Commercial applications for the present invention are extensive, including applications in the textile (e.g. cloth, tapis, matte), transportation, aerospace, marine, construction, household and agriculture industries. Fire-resistant cellulosic materials of the present invention may be used with commercially available polymer materials and existing conventional equipment, thereby reducing capital investment and investment risk involved with the production of polymer composites. This opens new opportunities for cellulose composites in more demanding fields such as the aerospace industry.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1A:
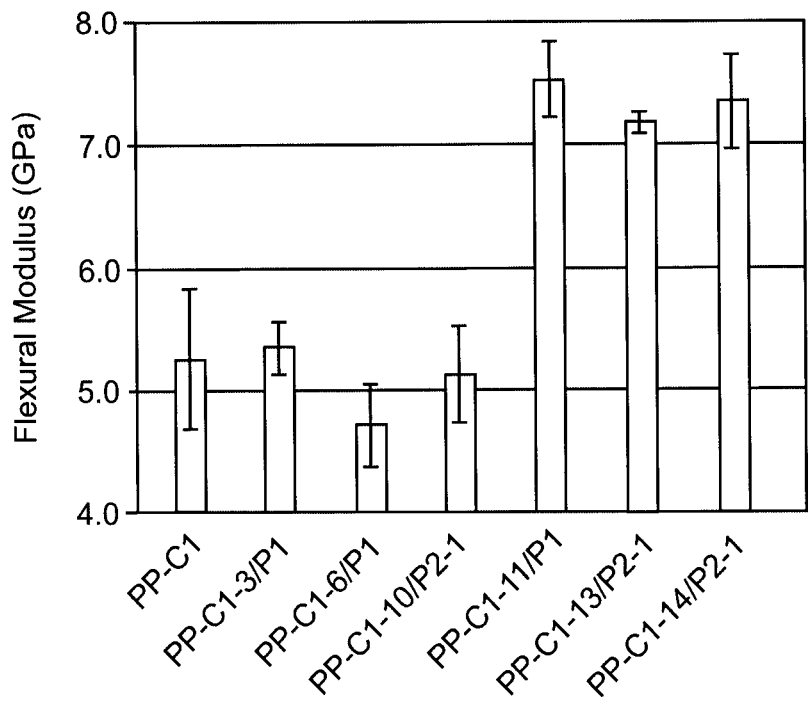
FIG. 1A depicts a graph comparing flexural modulus (GPa) of laminates prepared by compression of various polypropylene (PP)-flax fiber composites; and, FIG. 1B depicts a graph comparing flexural strength (MPa) of laminates prepared by compression of various polypropylene (PP)-flax fiber composites.

Without being held to any particular mode of action, there may be one or more possible explanations for the efficacy of the present invention. It is currently believed that alkalinity of the aqueous reaction mixture causes the surface of the cellulosic material to swell and possibly generate anionic groups in the cellulosic material, possibly due to the reaction of the hydroxide with —$CH_2OH$ groups of glucose and fructose units in the cellulose polymer. Alkaline earth metal or aluminum cations can then more easily penetrate the surface as the surface is swollen by alkalinity and the cations possibly form ionic bonds or otherwise interact with anions created by the hydroxide or with hydroxyl groups available on the fiber surface. Subsequent drying or heating then shrinks the surface of the cellulosic material further immobilizing the alkaline earth or aluminum metal on the cellulosic material. In this manner, a durable coating of alkaline earth or aluminum metal is formed on the cellulosic material giving rise to a self-extinguishing cellulosic material in which the coating is not easily washed off. In contrast, simply treating the cellulosic material with an alkaline earth metal salt or even an alkaline earth metal hydroxide that was pre-prepared does not lead to satisfactory self-extinguishing properties and the coating of alkaline earth metal is easily washed off eliminating what little effect the coating did have. Where a layered nanoparticulate material is employed, the layered nanoparticulate material may be attached chemically to the cellulosic material by ionic bonds (for example when montmorillonite (MMT) is used) or by strong van der Waals interactions including hydrogen bonds (for example when a layered double hydroxide (LDH) is used). Layered double hydroxides are particularly preferred since they provide greater surface coverage. When a surfactant is used to improve compatibility of the fire-resistant cellulosic material with a polymer matrix, the surfactant can bind to the surface of the layered nanoparticulate material.

EXAMPLE 1

Materials

Table 1 provides a description of chemicals and Table 2 provides a description of the fibers used in the following examples.

TABLE 1

Description of Chemicals

| Chemicals | Company | Purification |
|---|---|---|
| $CaCl_2 \cdot 2H_2O$ | Fisher | — |
| $Ca(NO_3)_2 \cdot 4H_2O$ | Aldrich | ≥99% |

TABLE 1-continued

Description of Chemicals

| Chemicals | Company | Purification |
|---|---|---|
| $Ca(OH)_2$ | Aldrich | ≥96% |
| $MgCl_2$ | Sigma Life Science | — |
| $MgSO_4$ | Sigma-Aldrich | ≥99.5% |
| $Mg(NO_3)_2 \cdot 6H_2O$ | Fluka | ≥99% |
| $Mg(OH)_2$ | Alfa Aesar | 95-100.5% |
| NaOH | Aldrich | ≥98% |
| KOH | Sigma-Aldrich | ≥90% |
| $Al(OH)_3$ | Aldrich | Reagent grade, $Al_2O_3$: 50-57% |
| $AlCl_3$ | Sigma-Aldrich | 98% |
| $NH_4OH$ | Sigma-Aldrich | ACS reagent, $NH_3$: 28-30% |
| $BaCl_2$ | Fisher | Lab grade |
| $BaCl_2 \cdot 2H_2O$ | JT Baker Chemical | 100.5% |
| $Ba(OH)_2$ | Aldrich | ~95% |
| Clay MMT | Southern Clay Products, Inc | Montmorillonite Cloisite Na ™ clay (CEC: 92 meq/100 g) |
| Clay LDH | AkzoNobel | Layered Double Hydroxides (LDH)-anionic clay |

TABLE 2

Description of Cellulosic Fibers

| Sample | Fiber | Weight (g/m²) |
|---|---|---|
| C1 | Belgium flax fabric C 20M-2/2 twill from Moss Composites received in 2008. It was cleaned with the cleaning product at 80° C. for 2 hours then rinsed three times with demineralized water. | 149 |
| C2 | Belgium flax fabric C 20M-2/2 twill from Moss Composites received in 2010. It was cleaned with the cleaning product at 80° C. for 2 hours then rinsed three times with demineralized water. | 149 |
| C3 | Belgium flax fabric C10M-8H satin from Moss Composites received in 2010. It was cleaned with the cleaning product at 80° C. for 2 hours then rinsed three times with demineralized water. | 258 |
| C4 | France unidirectional flax fiber Mutistrat MRCL1-180/17 UD 45° from Conseil Recherche Supstrats Textiles (CRST) received in 2010. It was cleaned with the cleaning product at 80° C. for 2 hours then rinsed three times with demineralized water. | 180 |
| C5 | France bi-directional flax fiber Mutistrat MRL2-250/12 bi biais 2 × 45° from Conseil Recherche Supstrats Textiles (CRST) received in 2009. It was cleaned with the cleaning product at 80° C. for 2 hours then rinsed three times with demineralized water. | 250 |
| C6 | Canada woven flax fabric from JBMatin received in 2010. It was cleaned with the cleaning product at 80° C. for 2 hours then rinsed three times with demineralized water. | 240 |
| C7 | Hemp mat 1 supplied by CIC. It was cleaned with the cleaning product at 80° C. for 2 hours then rinsed three times with demineralized water. | 350 |
| C8 | Hemp mat 2 supplied by CIC. It was cleaned with the cleaning product at 80° C. for 2 hours then rinsed three times with demineralized water. | 500 |
| C9 | Paper 1CHR from Whatman received in 2008. | 85 |
| C10 | Cotton pad from Govmark for UL94 test received in 2009. | 210 |
| C11 | Belgium flax fabric C 007M twill from Moss Composites received in 2012. It was cleaned with the cleaning product at 80° C. for 2 hours then rinsed three times with demineralized water. | 180 |

EXAMPLE 2

General Procedure for Treatment of Fibers

Solution Preparation:

In a single component solution, only one chemical is dissolved in demineralized water. For example, A2% means 2 wt % of this chemical A in demineralized water.

In a single component suspension, only one mineral (e.g. clay) is dispersed in demineralized water. For example, X2% means 2 wt % of mineral X in demineralized water.

In a bi-component solution or a bi-component suspension, separate solutions or suspensions of each of the two chemicals were prepared in an equal amount of demineralized water and then they were mixed together. If both of the solutions could produce hydroxide product, the ratio of the amount of the chemicals in the first and the second solutions was calculated based on the assumption that the reaction between the chemicals in the first and the second solutions was quantitative to form the hydroxide without excess amount of any chemical left over. For example, (A+B)2% means 2 wt % of the hydroxide product produced by the reaction between A and B assuming that the reaction was quantitative without having any excess amount of A or B in the product. If the two systems could not produce hydroxide product the concentrations of the chemical in the first and the second solutions or suspensions were equal.

Treatment Processes:

In one-step treatment processes (P1), about 10 g of cellulosic fiber was soaked in about 60 ml of a single component solution or a single component suspension or a bi-component solution for a period of time. The fibers were then dried in air for 6 hours and then in an oven at 120° C. for 2 hours prior to testing.

Two types of two-step treatment processes (P2-1 and P2-2) were used. In P2-1, 10 g of cellulosic fiber was soaked in about 60 ml of a single component solution or a single component suspension or a bi-component solution or a bi-component suspension for 5 to 300 seconds. The fibers were then removed from the treating medium and allowed to dry in air for 6 hours, and then dried in an oven at 120° C. for 2 hours. The dried fibers were then soaked in about 60 ml of another single component solution or a single component suspension or a bi-component solution or a bi-component suspension for 5 to 300 seconds. Finally the fibers were dried in air for 6 hours and then in an oven at 120° C. for 2 hours prior to testing. The concentrations of the first and the second solutions or suspensions were equal.

In P2-2, 10 g of cellulosic fiber was soaked in about 30 ml of a single component solution or a single component suspension or a bi-component solution or a bi-component suspension for 5 to 300 seconds. Then, about 30 ml of another single component solution or a single component suspension or a bi-component solution or a bi-component suspension was added into the system and mixed. The fibers were soaked for 5 to 300 seconds then removed them from the treating medium. Finally the fibers were dried in air for 6 hours, and then in an oven at 120° C. for 2 hours prior to testing.

EXAMPLE 3

General Procedure for Preparation of Fiber/Polymer Composite Plaques

For fiber/phenolic resin composites, fibers were dried in an oven at 120° C. for about 2 hours to remove humidity before use. Phenolic resin was then wetted on the fibers and dried in an oven to remove solvent from the resin and to let the resin transfer to stage B before compression. Wabash PC 100-2418-2TM compression was used to fabricate the composites under 100 psi pressure at 150° C. The amounts of polymer and fiber in the final product were about 60 wt % and 40 wt %, respectively. The thickness of the composite plaque was about 3 mm.

For fiber/polypropylene composites, fibers were dried in an oven at 120° C. for about 2 hours to remove humidity before use. Laminate composites were prepared with Basell Profax 1274 PCD by compression molding with Wabash PC 100-2418-2TM under 100 psi pressure at 190° C. The amounts of polymer and fiber used were about 60 wt % and 40 wt %, respectively. The thickness of the composite plaque was about 3 mm.

For fiber/epoxy composites, fibers were dried in an oven at 120° C. for about 2 hours to remove humidity before use. Laminate composites were prepared with Shell Epon 828 by compression molding with Wabash PC 100-2418-2TM under 100 psi pressure at 80° C. The amounts of polymer and fiber used were about 60 wt % and 40 wt %, respectively. The thickness of the composite plaque was about 3 mm.

For fiber/unsaturated polyester (UPE) composites, fibers were dried in an oven at 120° C. for about 2 hours to remove humidity before use. Laminate composites with Progress RL 2710 resin were prepared by compression molding with Wabash PC 100-2418-2TM under 100 psi pressure at 50° C. The amounts of polymer and fiber used were about 70 wt % and 30 wt %, respectively. The thickness of the composite plaque was about 3 mm. The UPE resin contains 20 wt % alumina trihydrate Hubert SB332.

EXAMPLE 4

General Procedure for Burning Tests

A Govmark UL94 and vertical chamber were used to conduct burning tests. For each example, results are provided using numbers and the terms "NB" and "G". The term "NB" means "no burning" and is an indication that there was no flame and no glow after removing the flame. "NB" represents excellent fire resistance as the sample did not continue to burn appreciably after the external flame source was removed, thus the sample was self-extinguishing. The term "NB/B" means that some fiber did not burn and that some fiber did burn. The term "G" means "glow" and is an indication that the sample continued to glow after removal of the flame. The numbers are the time in seconds that the sample continued to glow after removal of the flame.

UL94 Horizontal Burning Test (HB):

For fiber samples, five specimens having width×length (W×L) of 0.5×6.0 inch (12.7×152.4 mm) were cut from bulk fiber. Specimens were held at one end in a horizontal position and tilted at 45° with marks at 1, 1.5, 2.0, 2.5, 3.0, 3.5, 4.0, 4.5, 5.0 inch from the free end. A flame was applied to the free end of the specimen for 30 seconds or until the flame front reached the 1 inch mark. If combustion continued, the duration was timed between each 0.5 inch mark. A thin metallic wire was inserted to support the specimen.

For polypropylene, epoxy and unsaturated polyester (UPE) composite samples, five specimens having width×length (W×L) of 0.5×6.0 inch (12.7×152.4 mm) were cut from the 3 mm thick composite plaque prepared as described in Example 3. Specimens were held at one end in a horizontal position and tilted at 45° with marks at 1, 2.0, 3.0, 4.0, 5.0 inch from the free end. A flame was applied to the free end of the specimen for 30 seconds or until the flame front reached the 1 inch mark. If combustion continued, the duration was timed between each 1.0 inch mark.

UL94 Vertical Burning Test (VB):

For phenol formaldehyde composite samples, five specimens having width×length (W×L) of 0.5×6.0 inch (12.7×152.4 mm) were cut from the 3 mm thick composite plaque prepared as described in Example 3. Specimens were held at one end in the vertical position. The flame was applied for ten seconds and then removed until flaming stopped, at which time the flame was reapplied for another ten seconds and then removed. The combustion time and burning length were recorded.

Vertical Burning Test (VC-2):

For phenol formaldehyde composite samples, three specimens having width×length (W×L) of 3×12 inch (76.2×304.8 mm) were cut from the 3 mm thick composite plaque prepared as described in Example 3. Specimens were held at one end in the vertical position. The flame was applied for sixty seconds and then removed until flaming stopped. The combustion time and burning length was recorded. If the specimen has burning length and burning time less than 8 inch and 15 seconds, respectively, it is considered to be passed the standard (self-extinguished).

EXAMPLE 5

General Procedure for Mechanical Tests

Fibers:

Tensile tests on fibers were conducted on a tow (strand) disassembled from the fabric. The tows in the longitudinal direction in the fabric were separated from the ones in the orthogonal direction. Tests were carried out for both series separately. The tensile properties of the fiber tow were determined at room temperature and 50% relative humidity on an Instron 5548 micro-tester machine, with crosshead distance of 50 mm and speeds of 120 mm/min. The maximum load at break was recorded for each specimen. A minimum 10 specimens were tested for each type of sample.

Composites:

The tensile properties of the composites were determined at room temperature and 50% relative humidity on an Instron 5500R machine, with crosshead speeds of 5 mm/min according to ASTM 3039-00. A minimum 5 specimens were tested for each type of sample.

EXAMPLE 6

Fibers Treated with Single Component Solutions—Comparative

Belgium flax fiber samples C1 as described in Table 2 were treated with different single component solutions as indicated in Table 3 for 120 s using the process P1. Burning tests were conducted in accordance with the general procedure described in Example 4 and the results from the burning tests are also shown in Table 3. It is evident from Table 3 that all of the C1 fibers treated with various single component systems are not self-extinguishing, although these treatments slowed down flame propagation.

Belgium flax fiber samples C2 as described in Table 2 were treated with different single component systems as indicated in Table 4 for 120 s using the process P1. Burning tests were conducted in accordance with the general procedure described in Example 4 and the results from the burning tests are also shown in Table 4. It is evident from Table 4 that all of the fibers treated with a single component system, including a barium hydroxide system (C1-6/P1), are not self-extinguishing. Fibers treated with NaOH or KOH did not continue to burn but did continue to glow. Fibers treated with NaOH and then washed with water did continue to burn, demonstrating that any fire resistant effect afforded by an alkali metal hydroxide alone is easily removed if the fibers get wet.

Collectively, Tables 3 and 4 demonstrate that single component systems of metal hydroxides, metal salts or clays do not impart self-extinguishing properties on fibers treated with the systems.

TABLE 3

C1 Fibers Treated with Single Component Solutions

| | | Burning Length (inches) | | | | | | |
|---|---|---|---|---|---|---|---|---|
| | | 0.5 | 1.0 | 1.5 | 2.0 | 2.5 | 3.0 | 3.5 |
| Sample | Description | Burning Time (seconds) | | | | | | |
| C1 | Untreated C1 | 3 | 7 | 10 | 14 | 17 | 21 | 25 |
| C1-1/P1 | C1 + clay MMT2%/P1 | 5 | 9 | 14 | 18 | 22 | 26 | 31 |
| C1-2/P1 | C1 + clay MMT4%/P1 | 5 | 9 | 14 | 18 | 22 | 27 | 31 |
| C1-3/P1 | C1 + clay LDH2%/P1 | 5 | 9 | 14 | 20 | 25 | 30 | 34 |
| C1-4/P1 | C1 + clay LDH4%/P1 | 6 | 13 | 19 | 25 | 30 | 38 | 44 |
| C1-5/P1 | C1 + (BaCl$_2$)2%/P1 | 4 | 7 | 11 | 15 | 18 | 22 | 26 |
| C1-6/P1 | C1 + (Ba(OH)$_2$)2% | 5 | 8 | 14 | 18 | 23 | 27 | 32 |
| C1-7/P1 | C1 + (BaCl$_2$)2% then washed with water | 4 | 7 | 10 | 14 | 17 | 21 | 25 |
| C1-8/P1 | C1 + (Ba(OH)$_2$)2% then washed with water | 5 | 8 | 14 | 18 | 22 | 26 | 31 |

TABLE 4

C2 Fibers Treated with Single Component Solutions

| | | Burning Length (inches) | | | | | | | | |
|---|---|---|---|---|---|---|---|---|---|---|
| | | 0.5 | 1.0 | 1.5 | 2.0 | 2.5 | 3.0 | 3.5 | 4.0 | 4.5 |
| Sample | Description | Average Burning Time (seconds) | | | | | | | | |
| C2 | Untreated C2 | 2.8 | 5.4 | 7.6 | 10.1 | 12.6 | 15.2 | 17.6 | 20.1 | 22.5 |
| C2-1/P1 | C2 + (Ba(OH)$_2$)2% | 3.2 | 6.1 | 8.9 | 11.9 | 15 | 17.6 | 20.4 | 23.3 | 26.5 |
| C2-2/P1 | C2 + (BaCl$_2$)2% | 2.3 | 5.0 | 7.1 | 9.1 | 11.0 | 13.3 | 15.3 | 17.5 | 19.8 |
| C2-3/P1 | C2 + (BaCl$_2$)2% twice | 4.0 | 7.3 | 9.8 | 12.6 | 14.7 | 17.8 | 20.1 | 22.4 | 25.2 |
| C2-4/P1 | C2 + (MgNO$_3$)2% | 2.3 | 4.8 | 7.1 | 9.4 | 11.4 | 14.0 | 16.0 | 18.1 | 20.3 |
| C2-5/P1 | C2 + (MgCl$_2$)2% | 3.7 | 6.1 | 8.8 | 11.7 | 15.3 | 18.2 | 21.7 | 24.6 | 27 |
| C2-6/P1 | C2 + (MgSO$_4$)2% | 2.6 | 5.2 | 7.3 | 9.5 | 11.5 | 14.0 | 16.2 | 18.1 | 19.5 |
| C2-7/P1 | C2 + (Mg(OH)$_2$)2% | 3.0 | 6.2 | 8.2 | 10.1 | 12.1 | 14.6 | 16.4 | 18.8 | 20.6 |
| C2-8/P1 | C2 + (Ca(NO$_3$)2% | 2.6 | 4.8 | 7.0 | 8.7 | 10.9 | 12.6 | 14.6 | 16.3 | 18.1 |
| C2-9/P1 | C2 + (CaCl$_2$)2% | 2.8 | 5.1 | 7.5 | 9.5 | 11.6 | 14.3 | 16.6 | 19.0 | 21.0 |
| C2-10/P1 | C2 + (KOH)2% | G | G | G | G | G | G | G | G | G-250 |
| C2-11/P1 | C2 + (NaOH)2% | G | G | G | G | G | G | G | G | G-250 |
| C2-12/P1 | C2 + (NaOH)2% twice | G | G | G | G | G | G | G | G | G-280 |
| C2-13/P1 | C2 + (NaOH)2% then washed with water | 2.8 | 5.5 | 7.7 | 10.0 | 12.5 | 14.5 | 17.0 | 19.7 | 22.0 |
| C2-14/P1 | C2 + (AlCl$_3$)2% | 3.6 | 6.5 | 9.2 | 12.3 | 15.4 | 18.4 | 21.3 | 24.8 | 27.8 |
| C2-15/P1 | C2 + (Al(OH)$_3$)2% | 2.8 | 5.3 | 7.8 | 10.2 | 11.8 | 14.7 | 16.6 | 18.6 | 20.9 |

EXAMPLE 7

Fibers Treated with Bi-component Solutions

C1 Fibers Treated with Barium-Containing Bi-Component Systems:

Belgium flax fiber samples C1 as described in Table 2 were treated with different barium-containing bi-component systems as indicated in Table 5 for 120 s using the processes P1 and P2-1. Burning tests were conducted in accordance with the general procedure described in Example 4 and the results from the burning tests are also shown in Table 5. It is evident from Table 5 that all of the C1 fibers treated with bi-component systems involving the mixture of barium chloride and sodium hydroxide are self-extinguishing. Fibers treated with barium chloride alone then with clay or barium hydroxide alone then with clay are not self-extinguishing. Thus, single component systems are not self-extinguishing, even with the subsequent addition of clay. A mixture of both the alkaline metal salt and the alkali metal hydroxide is needed to make the fibers self-extinguishing. It is further clear that washing the fibers after treatment with a bi-component system does not remove the self-extinguishing properties imparted by the treatment. Further, the order in which clay is introduced into the bi-component does not affect the self-extinguishing properties of the fibers after treatment.

TABLE 5

C1 Fibers Treated with Barium-containing Bi-component Systems

| Sample | Description | Burning Length (inches) | | | | | | |
|---|---|---|---|---|---|---|---|---|
| | | 0.5 | 1.0 | 1.5 | 2.0 | 2.5 | 3.0 | 3.5 |
| | | Burning Time (seconds) | | | | | | |
| C1 | Untreated C1 | 3 | 7 | 10 | 14 | 17 | 21 | 25 |
| C1-9/P2-1 | C1 + (BaCl$_2$)2% then + clay MMT2% | 4 | 8 | 13 | 17 | 21 | 26 | 31 |
| C1-10/P2-1 | C1 + (Ba(OH)$_2$)2% then + clay LDH2% | 5 | 11 | 15 | 20 | 25 | 30 | 35 |
| C1-11/P1 | C1 + (BaCl$_2$ + NaOH)2% | NB | NB | NB | NB | NB | NB | NB |
| C1-12/P1 | C1 + (BaCl$_2$ + NaOH)2% then washed with water | NB | NB | NB | NB | NB | NB | NB |
| C1-13/P2-1 | C1 + (BaCl$_2$ + NaOH)2% then + clay MMT2% | NB | NB | NB | NB | NB | NB | NB |
| C1-14/P2-1 | C1 + (BaCl$_2$ + NaOH)2% then + clay LDH2% | NB | NB | NB | NB | NB | NB | NB |
| C1-15/P2-1 | C1 + clay MMT2% then + (BaCl$_2$ + NaOH)2% | NB | NB | NB | NB | NB | NB | NB |
| C1-16/P2-1 | C1 + clay LDH2% then + (BaCl$_2$ + NaOH)2% | NB | NB | NB | NB | NB | NB | NB |

C2 Fibers Treated with a Barium-Containing Bi-Component System:

Nine different specimens of Belgium flax fiber samples C2 as described in Table 2 were treated with one barium-containing bi-component systems as indicated in Table 6 for 120 s using the process P1. Burning tests were conducted in accordance with the general procedure described in Example 4 and the results from the burning tests are also shown in Table 6. It is evident from Table 6 that fiber quality is not always consistent even in the same batch, and that fire resistance behavior of fibers treated with a bi-component system (BaCl$_2$+ NaOH)2% can vary from specimen to specimen. Some specimens are self-extinguishing while others are not, although they were all treated at the same time.

TABLE 6

C2 Fibers Treated with a Barium-containing Bi-component System

| Sample | Description | Burning Length (inches) | | | | | | | | |
|---|---|---|---|---|---|---|---|---|---|---|
| | | 0.5 | 1.0 | 1.5 | 2.0 | 2.5 | 3.0 | 3.5 | 4.0 | 4.5 |
| | | Burning Time (seconds) | | | | | | | | |
| C2 | Untreated C2 | 2.8 | 5.4 | 7.6 | 10.1 | 12.6 | 15.2 | 17.6 | 20.1 | 22.5 |
| C2-16/P1 | C2 + (BaCl$_2$ + NaOH)2% specimen 1 | NB | NB | NB | NB | NB | NB | NB | NB | NB |
| | C2 + (BaCl$_2$ + NaOH)2% specimen 2 | NB | NB | NB | NB | NB | NB | NB | NB | NB |
| | C2 + (BaCl$_2$ + NaOH)2% specimen 3 | NB | NB | NB | NB | NB | NB | NB | NB | NB |
| | C2 + (BaCl$_2$ + NaOH)2% specimen 4 | NB | NB | NB | NB | NB | NB | NB | NB | NB |
| | C2 + (BaCl$_2$ + NaOH)2% specimen 5 | 5.0 | 8.5 | 11.0 | 13.5 | 16.5 | 19.5 | 22.0 | 26.0 | 31.0 |
| | C2 + (BaCl$_2$ + NaOH)2% specimen 6 | 4.5 | 10.5 | 14.5 | 18.5 | 21.5 | 27.5 | 31.5 | 35.5 | 39.5 |
| | C2 + (BaCl$_2$ + NaOH)2% specimen 7 | 4.0 | 8.5 | 11.5 | 14.5 | 18.5 | 22.5 | 26.5 | 30.0 | 34.0 |
| | C2 + (BaCl$_2$ + NaOH)2% specimen 8 | 4.5 | 8.5 | 11.0 | 14.0 | 17.5 | 21.0 | 24.5 | 27.0 | 31.5 |
| | C2 + (BaCl$_2$ + NaOH)2% specimen 9 | 5.0 | 8.5 | 11.5 | 14.5 | 18.5 | 21.0 | 24.5 | 28.5 | 32 |

C2 Fibers Treated with a Calcium-Containing Bi-Component System at Different Treatment Periods:

Belgium flax fiber samples C2 as described in Table 2 were treated with calcium-containing bi-component systems as indicated in Table 7 for different treatment periods from 5-300 s using the process P1. Burning tests were conducted in accordance with the general procedure described in Example 4 and the results from the burning tests are also shown in Table 7. It is evident from Table 7 that fibers treated with bi-component system ($CaCl_2$+NaOH)2% at different treatment periods (5-300 s) are all self-extinguishing. Further, the ($CaCl_2$+NaOH)2% system appears to have greater tolerance to cellulosic fiber quality than the ($BaCl_2$+NaOH)2% system (compare Table 6 to Table 7).

TABLE 7

C2 Fibers Treated with a Calcium-containing Bi-component System at Different Treatment Periods

| | | Burning Length (inches) | | | | | | | | |
| --- | --- | --- | --- | --- | --- | --- | --- | --- | --- | --- |
| | | 0.5 | 1.0 | 1.5 | 2.0 | 2.5 | 3.0 | 3.5 | 4.0 | 4.5 |
| Sample | Description | Burning Time (seconds) | | | | | | | | |
| C2 | Untreated C2 | 2.8 | 5.4 | 7.6 | 10.1 | 12.6 | 15.2 | 17.6 | 20.1 | 22.5 |
| C2-17/P1 | C2 + ($CaCl_2$ + NaOH)2% impregnated 5 s | NB | NB | NB | NB | NB | NB | NB | NB | NB |
| C2-18/P1 | C2 + ($CaCl_2$ + NaOH)2% impregnated 10 s | NB | NB | NB | NB | NB | NB | NB | NB | NB |
| C2-19/P1 | C2 + ($CaCl_2$ + NaOH)2% impregnated 30 s | NB | NB | NB | NB | NB | NB | NB | NB | NB |
| C2-20/P1 | C2 + ($CaCl_2$ + NaOH)2% impregnated 60 s | NB | NB | NB | NB | NB | NB | NB | NB | NB |
| C2-21/P1 | C2 + ($CaCl_2$ + NaOH)2% impregnated 120 s | NB | NB | NB | NB | NB | NB | NB | NB | NB |
| C2-22/P1 | C2 + ($CaCl_2$ + NaOH)2% impregnated 180 s | NB | NB | NB | NB | NB | NB | NB | NB | NB |
| C2-23/P1 | C2 + ($CaCl_2$ + NaOH)2% impregnated 300 s | NB | NB | NB | NB | NB | NB | NB | NB | NB |

C2 Fibers Treated with a Calcium-Containing Bi-Component System at Different Concentrations:

Belgium flax fiber samples C2 as described in Table 2 were treated with one calcium-containing bi-component systems at different concentrations from 1 wt % to 3 wt % of the hydroxide product of the alkaline metal salt and alkali metal hydroxide as indicated in Table 8 for 120 s using the process P1. Burning tests were conducted in accordance with the general procedure described in Example 4 and the results from the burning tests are also shown in Table 8. It is evident from Table 8 that to obtain self-extinguishing fibers treated with the bi-component system ($CaCl_2$+NaOH) for 120 s using the process P1, the minimum concentration must be 1.5%.

TABLE 8

C2 Fibers Treated with a Calcium-containing Bi-component System at Different Concentrations

| | | Burning Length (inches) | | | | | | | | |
| --- | --- | --- | --- | --- | --- | --- | --- | --- | --- | --- |
| | | 0.5 | 1.0 | 1.5 | 2.0 | 2.5 | 3.0 | 3.5 | 4.0 | 4.5 |
| Sample | Description | Burning Time (seconds) | | | | | | | | |
| C2 | Untreated C2 | 2.8 | 5.4 | 7.6 | 10.1 | 12.6 | 15.2 | 17.6 | 20.1 | 22.5 |
| C2-24/P1 | C2 + ($CaCl_2$ + NaOH)1% | 4.0 | 7.6 | 11.5 | 13.9 | 17.0 | 20.0 | 23.2 | 25.7 | 28.4 |
| C2-25/P1 | C2 + ($CaCl_2$ + NaOH)1.5% | NB | NB | NB | NB | NB | NB | NB | NB | NB |
| C2-21/P1 | C2 + ($CaCl_2$ + NaOH)2% | NB | NB | NB | NB | NB | NB | NB | NB | NB |
| C2-26/P1 | C2 + ($CaCl_2$ + NaOH)3% | NB | NB | NB | NB | NB | NB | NB | NB | NB |

C2 Fibers Treated with Magnesium-Containing Bi-Component Systems at Different Concentrations:

Belgium flax fiber samples C2 as described in Table 2 were treated with magnesium sulfate-containing bi-component systems at 1 wt % and 2 wt % of the hydroxide product of the alkaline metal salt and alkali metal hydroxide as indicated in Table 9 for 120 s using the process P1. Burning tests were conducted in accordance with the general procedure described in Example 4 and the results from the burning tests are also shown in Table 9.

TABLE 9

Fibers Treated with a Magnesium Sulfate-containing Bi-component System at Different Concentrations

| | | Burning Length (inches) | | | | | | | | |
|---|---|---|---|---|---|---|---|---|---|---|
| | | 0.5 | 1.0 | 1.5 | 2.0 | 2.5 | 3.0 | 3.5 | 4.0 | 4.5 |
| Sample | Description | Burning Time (seconds) | | | | | | | | |
| C2 | Untreated C2 | 2.8 | 5.4 | 7.6 | 10.1 | 12.6 | 15.2 | 17.6 | 20.1 | 22.5 |
| C2-27/P1 | C2 + (MgSO$_4$ + NaOH)1% | 4.4 | 8.3 | 11.6 | 14.6 | 18.3 | 21.8 | 25.6 | 28.7 | 32.3 |
| C2-28/P1 | C2 + (MgSO$_4$ + NaOH)2% | 5.1 | 10.6 | 14.6 | 19.5 | 24.7 | 29.5 | 33.7 | 38.7 | 43.4 |

Belgium flax fiber samples C2 as described in Table 2 were treated with magnesium chloride-containing bi-component systems at 1 wt % and 2 wt % of the hydroxide product of the alkaline metal salt and alkali metal hydroxide as indicated in Table 10 for 120 s using the process P1. Burning tests were conducted in accordance with the general procedure described in Example 4 and the results from the burning tests are also shown in Table 10.

TABLE 10

Fibers Treated with a Magnesium Chloride-containing Bi-component System at Different Concentrations

| | | Burning Length (inches) | | | | | | | | |
|---|---|---|---|---|---|---|---|---|---|---|
| | | 0.5 | 1.0 | 1.5 | 2.0 | 2.5 | 3.0 | 3.5 | 4.0 | 4.5 |
| Sample | Description | Burning Time (seconds) | | | | | | | | |
| C2 | Untreated C2 | 2.8 | 5.4 | 7.6 | 10.1 | 12.6 | 15.2 | 17.6 | 20.1 | 22.5 |
| C2-29/P1 | C2 + (MgCl$_2$ + NaOH)1% | 5.1 | 11.0 | 15.2 | 19.3 | 24.0 | 30.4 | 34.7 | 39.9 | 47.0 |
| C2-30/P1 | C2 + (MgCl$_2$ + NaOH)2% | 7.0 | 14.0 | NB | NB | NB | NB | NB | NB | NB |

It is evident from Table 9 that all fibers treated with the (MgSO$_4$+NaOH) system burned at a slower rate than the untreated one but they are not self-extinguishing. From Table 10, it is evident that fibers are self-extinguishing after treatment with the bi-component system (MgCl$_2$+NaOH) for 120 s using the process P1 at 2.0% solution, but not for the 1.0% solution. Thus, (MgCl$_2$+NaOH) is more effective than the (MgSO$_4$+NaOH). Therefore, sulfate is not as good a counter anion in the alkaline metal salt as chloride.

C2 Fibers Treated with NaOH and CaCl$_2$ or NaOH and Clay

Belgium flax fiber samples C2 as described in Table 2 were treated sequentially with calcium chloride and sodium hydroxide in different orders as indicated in Table 11 for 120 s using the process P2-2. Likewise, C2 fibers were treated with sodium hydroxide and then clay as indicated in Table 11 for 120 s using the process P2-2. Burning tests were conducted in accordance with the general procedure described in Example 4 and the results from the burning tests are also shown in Table 11. It is evident from Table 11 that fibers treated first with NaOH and then with CaCl$_2$ are self-extinguishing, but this is not the case for the reverse order although the burning time is slower when compared to untreated fiber. Further, fibers treated with a 2.0% solution of NaOH and then a 2.0% suspension of MMT clay are not self-extinguishing but the burning time is slower when compared to untreated fiber.

TABLE 11

Fibers Treated with NaOH and CaCl₂ or NaOH and Clay

| | | Burning Length (inches) | | | | | | | | |
|---|---|---|---|---|---|---|---|---|---|---|
| | | 0.5 | 1.0 | 1.5 | 2.0 | 2.5 | 3.0 | 3.5 | 4.0 | 4.5 |
| Sample | Description | Burning Time (seconds) | | | | | | | | |
| C2 | Untreated C2 | 2.8 | 5.4 | 7.6 | 10.1 | 12.6 | 15.2 | 17.6 | 20.1 | 22.5 |
| C2-31/P2-2 | (C2 + NaOH) then add CaCl₂ | G 125 | NB | NB | NB | NB | NB | NB | NB | NB |
| C2-32/P2-2 | (C2 + CaCl₂) then add NaOH | 4.4 | 8.4 | 12.6 | 15.2 | 17.8 | 20.6 | 22.6 | 25.0 | 28.0 |
| C2-33/P2-2 | C2 + (NaOH)2% then add clay MMT2% | 4.1 | 7.6 | 10.6 | 13.5 | 16.6 | 19.9 | 22.9 | 25.7 | 29.0 |

C2 Fibers Treated with Different Aluminum-Containing Bi-Component Systems

Belgium flax fiber samples C2 as described in Table 2 were treated with aluminum chloride-containing bi-component systems at different concentrations (0.75-2 wt %) of the hydroxide product of the aluminum salt and hydroxide as indicated in Table 12 for 120 s using the process P1. Burning tests were conducted in accordance with the general procedure described in Example 4 and the results from the burning tests are also shown in Table 12. It is evident from Table 12 that aluminum chloride together with ammonium hydroxide at a concentration of 0.75% or more resulted in fibers that were self-extinguishing, but this is not the case with aluminum chloride with sodium hydroxide, although the rate of burning was slowed relative to untreated fibers.

TABLE 12

Fibers Treated with Aluminum-containing Bi-component Systems

| | | Burning Length (inches) | | | | | | | | |
|---|---|---|---|---|---|---|---|---|---|---|
| | | 0.5 | 1.0 | 1.5 | 2.0 | 2.5 | 3.0 | 3.5 | 4.0 | 4.5 |
| Sample | Description | Burning Time (seconds) | | | | | | | | |
| C2 | Untreated C2 | 2.8 | 5.4 | 7.6 | 10.1 | 12.6 | 15.2 | 17.6 | 20.1 | 22.5 |
| C2-34/P1 | C2 + (AlCl₃ + NH₄OH)2% | NB | NB | NB | NB | NB | NB | NB | NB | NB |
| C2-35/P1 | C2 + (AlCl₃ + NH₄OH)1.5% | NB | NB | NB | NB | NB | NB | NB | NB | NB |
| C2-36/P1 | C2 + (AlCl₃ + NH₄OH)1.0% | G | NB | NB | NB | NB | NB | NB | NB | NB |
| C2-37/P1 | C2 + (AlCl₃ + NH₄OH)0.75% | G 7.9 | NB | NB | NB | NB | NB | NB | NB | NB |
| C2-38/P1 | C2 + (AlCl₃ + NaOH)0.5% | 3.2 | 6.7 | 11.1 | NB/B | NB/B | NB/B | NB/B | NB/B | NB/B |
| C2-39/P1 | C2 + (AlCl₃ + NaOH)2% | 6.7 | 12.9 | 16.9 | 20.4 | 24.6 | 28.7 | 32.7 | 36.4 | 40.0 |

C2 Fibers Treated with Bi-Component Systems Containing Different Magnesium and Calcium Salts Belgium flax fiber samples C2 as described in Table 2 were treated with bi-component systems containing different magnesium and calcium salts at 2 wt % of the hydroxide product of the alkaline earth metal salt and hydroxide as indicated in Table 13 for 120 s using the process P1. Burning tests were conducted in accordance with the general procedure described in Example 4 and the results from the burning tests are also shown in Table 13. It is evident from Table 13 that fibers treated with (MgCl₂+NaOH)2% and with (CaCl₂+NaOH)2% are self-extinguishing. Fibers treated with (Mg(NO₃)₂+NaOH)2% and with (Ca(NO₃)₂+NaOH)2% did not burn but continued to glow. Fibers treated with (MgSO₄+NaOH)2% continued to burn, but at a slower rate than untreated fibers. The efficiency of the (MgCl₂+NaOH)2% system is greater than the (Mg(NO₃)₂+NaOH)2% system, which is greater than the (MgSO₄+NaOH)2% system. This is also similar for the calcium-containing systems where the efficiency of the (CaCl₂+NaOH)2% system is greater than the (Ca(NO₃)₂+NaOH)2% system. Thus, chloride is the most preferred counter anion for the alkaline earth metal cation.

TABLE 13

Fibers Treated with Mg- and Ca-containing Bi-component Systems

| | | Burning Length (inches) | | | | | | | | |
|---|---|---|---|---|---|---|---|---|---|---|
| | | 0.5 | 1.0 | 1.5 | 2.0 | 2.5 | 3.0 | 3.5 | 4.0 | 4.5 |
| Sample | Description | Burning Time (seconds) | | | | | | | | |
| C2 | Untreated C2 | 2.8 | 5.4 | 7.6 | 10.1 | 12.6 | 15.2 | 17.6 | 20.1 | 22.5 |
| C2-30/P1 | C2 + (MgCl₂ + NaOH)2% | 7.0 | 14.0 | NB | NB | NB | NB | NB | NB | NB |
| C2-40/P1 | C2 + (Mg(NO₃)₂ + NaOH)2% | G | G | G | G | G | G | G | G | G 180-260 |
| C2-28/P1 | C2 + (MgSO₄ + NaOH)2% | 5.1 | 10.6 | 14.6 | 19.5 | 24.7 | 29.5 | 33.7 | 38.7 | 43.4 |

TABLE 13-continued

Fibers Treated with Mg- and Ca-containing Bi-component Systems

| | | Burning Length (inches) | | | | | | | | |
|---|---|---|---|---|---|---|---|---|---|---|
| | | 0.5 | 1.0 | 1.5 | 2.0 | 2.5 | 3.0 | 3.5 | 4.0 | 4.5 |
| Sample | Description | Burning Time (seconds) | | | | | | | | |
| C2-21/P1 | C2 + (CaCl$_2$ + NaOH)2% | NB | NB | NB | NB | NB | NB | NB | NB | NB |
| C2-41/P1 | C2 + (Ca(NO$_3$)2 + NaOH)2% | G | G | G | G | G | G | G | G | G 50-300 |

Different Fibers Treated with a Calcium-Containing Bi-Component Systems

Various fiber samples C2, C3, C4 and C7 as described in Table 2 were treated with a calcium-containing bi-component systems as indicated in Table 14 for 120 s using the process P1. Burning tests were conducted in accordance with the general procedure described in Example 4 and the results from the burning tests are also shown in Table 14. It is evident from Table 14 that all of the fibers were self-extinguishing after treatment with the (CaCl$_2$+NaOH)2% system.

TABLE 14

Different Fibers Treated with a Calcium-containing Bi-component Systems

| | | Burning Length (inches) | | | | | | | | |
|---|---|---|---|---|---|---|---|---|---|---|
| | | 0.5 | 1.0 | 1.5 | 2.0 | 2.5 | 3.0 | 3.5 | 4.0 | 4.5 |
| Sample | Description | Burning Time (seconds) | | | | | | | | |
| C2 | Untreated C2 | 2.8 | 5.4 | 7.6 | 10.1 | 12.6 | 15.2 | 17.6 | 20.1 | 22.5 |
| C2-21/P1 | C2 + (CaCl2 + NaOH)2% | NB | NB | NB | NB | NB | NB | NB | NB | NB |
| C3 | Untreated C3 | 4.6 | 8.5 | 12.0 | 15.5 | 19.0 | 22.9 | 26.6 | 30.2 | 34.1 |
| C3-1/P1 | C3 + (CaCl2 + NaOH)2% | G | G 20-85 | NB | NB | NB | NB | NB | NB | NB |
| C4 | Untreated C4 | Burned fast and whole sample was fired | | | | | | | | 12 |
| C4-1/P1 | C4 + (CaCl2 + NaOH)2% | NB-G 10-15 | NB | NB | NB | NB | NB | NB | NB | NB |
| C7 | Untreated C7 | 2.9 | 5.7 | 8.0 | 10.0 | 12.4 | 14.8 | 17.2 | 19.6 | 22.6 |
| C7-1/P1 | C7 + (CaCl2 + NaOH)2% | G 25-80 | NB | NB | NB | NB | NB | NB | NB | NB |

Different Fibers Treated with a Magnesium-Containing Bi-Component Systems

Various fiber samples C2, C3, C4, C6 and C7 as described in Table 2 were treated with a magnesium-containing bi-component systems as indicated in Table 15 for 120 s using the process P1. Burning tests were conducted in accordance with the general procedure described in Example 4 and the results from the burning tests are also shown in Table 15. It is evident from Table 15 that all of the fibers were self-extinguishing after treatment with the (MgCl$_2$+NaOH)2% system. Taken together, Tables 14 and 15 show that the treatments are useful across a range of cellulosic materials.

TABLE 15

Different Fibers Treated with a Magnesium-containing Bi-component Systems

| | | Burning Length (inches) | | | | | | | | |
|---|---|---|---|---|---|---|---|---|---|---|
| | | 0.5 | 1.0 | 1.5 | 2.0 | 2.5 | 3.0 | 3.5 | 4.0 | 4.5 |
| Sample | Description | Burning Time (seconds) | | | | | | | | |
| C2 | Untreated C2 | 2.8 | 5.4 | 7.6 | 10.1 | 12.6 | 15.2 | 17.6 | 20.1 | 22.5 |
| C2-30/P1 | C2 + (MgCl$_2$ + NaOH)2% | 7.0 | 14.0 | NB | NB | NB | NB | NB | NB | NB |
| C3 | Untreated C3 | 4.6 | 8.5 | 12.0 | 15.5 | 19.0 | 22.9 | 26.6 | 30.2 | 34.1 |
| C3-2/P1 | C3 + (MgCl$_2$ + NaOH)2% | G | G 80-110 | NB | NB | NB | NB | NB | NB | NB |
| C4 | Untreated C4 | Burn fast and whole sample was fired | | | | | | | | 12 |
| C4-2/P1 | C4 + (MgCl$_2$ + NaOH)2% | NB | NB | NB | NB | NB | NB | NB | NB | NB |
| C6 | Untreated C6 | 2.6 | 4.8 | 6.7 | 8.4 | 10.3 | 12.0 | 13.9 | 15.6 | 18.0 |
| C6-2/P1 | C6 + (MgCl$_2$ + NaOH)2% | G | G 35-215 | NB | NB | NB | NB | NB | NB | NB |
| C7 | Untreated C7 | 2.9 | 5.7 | 8.0 | 10.0 | 12.4 | 14.8 | 17.2 | 19.6 | 22.6 |
| C7-2/P1 | C7 + (MgCl$_2$ + NaOH)2% | G 20-70 | NB | NB | NB | NB | NB | NB | NB | NB |

Different Fibers Treated with an Aluminum-containing Bi-component Systems

Various fiber samples C2-C11 as described in Table 2 were treated with an aluminum-containing bi-component systems as indicated in Table 16 for 120 s using the process P1. Burning tests were conducted in accordance with the general procedure described in Example 4 and the results from the burning tests are also shown in Table 16. It is evident from Table 16 that all of the fibers were self-extinguishing after treatment with the $(AlCl_3+NH_4OH)2\%$ system. Taken together, Tables 14, 15 and 16 show that the treatments are useful across a range of cellulose materials.

TABLE 16

Different Fibers Treated with an Aluminum-containing Bi-component Systems

| | | Burning Length (inches) | | | | | | | | |
|---|---|---|---|---|---|---|---|---|---|---|
| | | 0.5 | 1.0 | 1.5 | 2.0 | 2.5 | 3.0 | 3.5 | 4.0 | 4.5 |
| Sample | Description | | | | Burning Time (seconds) | | | | | |
| C2 | Untreated C2 | 2.8 | 5.4 | 7.6 | 10.1 | 12.6 | 15.2 | 17.6 | 20.1 | 22.5 |
| C2-34/P1 | C2 + $(AlCl_3 + NH_4OH)2\%$ | NB | NB | NB | NB | NB | NB | NB | NB | NB |
| C3 | Untreated C3 | 4.6 | 8.5 | 12.0 | 15.5 | 19.0 | 22.9 | 26.6 | 30.2 | 34.1 |
| C3-3/P1 | C3 + $(AlCl_3 + NH_4OH)2\%$ | NB | NB | NB | NB | NB | NB | NB | NB | NB |
| C4 | Untreated C4 | | | | Burn fast and whole sample was fired | | | | | 12 |
| C4-3/P1 | C4 + $(AlCl_3 + NH_4OH)2\%$ | NB | NB | NB | NB | NB | NB | NB | NB | NB |
| C5 | Untreated C5 | | | | Whole sample was fired | | | | | 40 |
| C5-3/P1 | C5 + $(AlCl_3 + NH_4OH)2\%$ | NB | NB | NB | NB | NB | NB | NB | NB | NB |
| C6 | Untreated C6 | 2.6 | 4.8 | 6.7 | 8.4 | 10.3 | 12.0 | 13.9 | 15.6 | 18.0 |
| C6-3/P1 | C6 + $(AlCl_3 + NH_4OH)2\%$ | NB | NB | NB | NB | NB | NB | NB | NB | NB |
| C7 | Untreated C7 | 2.9 | 5.7 | 8.0 | 10.0 | 12.4 | 14.8 | 17.2 | 19.6 | 22.6 |
| C7-3/P1 | C7 + $(AlCl_3 + NH_4OH)2\%$ | NB | NB | NB | NB | NB | NB | NB | NB | NB |
| C8 | Untreated C8 | | | | Burn fast and whole sample was fired | | | | | 10-15 |
| C8-3/P1 | C8 + $(AlCl_3 + NH_4OH)2\%$ | NB | NB | NB | NB | NB | NB | NB | NB | NB |
| C9 | Untreated C9 | 1.9 | 3.7 | 5.4 | 6.8 | 8.5 | 10.2 | 11.8 | 13.0 | 14.2 |
| C9-3/P1 | C9 + $(AlCl_3 + NH_4OH)2\%$ | NB | NB | NB | NB | NB | NB | NB | NB | NB |
| C10 | Untreated C10 | | | | Burn fast and whole sample was fired | | | | | 7.6 |
| C10-3/P1 | C10 + $(AlCl_3 + NH_4OH)2\%$ | NB | NB | NB | NB | NB | NB | NB | NB | NB |
| C11 | Untreated C11 | 4.5 | 9.7 | 15.3 | 20.7 | 26.3 | 31.8 | 38.2 | 43.3 | 48.7 |
| C11-3/P1 | C11 + $(AlCl_3 + NH_4OH)2\%$ | NB | NB | NB | NB | NB | NB | NB | NB | NB |

EXAMPLE 8

Tensile Properties of Fiber Tows

Tensile properties of untreated Belgium flax fiber samples C2 as described in Table 2 and of various treated C2 fiber samples were measured in accordance with the procedure described in Example 5. Table 16 lists the fiber tows that were tested as well as their tensile properties. The tows in the longitudinal direction in the fabric are denoted as parallel, whereas the ones in the orthogonal direction are denoted as perpendicular.

It is evident from Table 17 that the tensile properties did not change much for most of the systems indicating that treatment did not generally have a detrimental effect on tensile properties. However, for fibers treated with alkali metal hydroxide alone (e.g. $(KOH)2\%$ and $(NaOH)2\%$) or treated with aluminum-containing salt (e.g. $(AlCl_3+NH_4OH)2\%$), there is a significant loss in tensile properties. It is clear, therefore, that cellulosic materials treated with both alkaline earth metal salt and alkali metal hydroxide are advantageously very fire retardant, often self-extinguishing, while retaining good tensile properties, in contrast to fibers treated only with alkali metal hydroxide or treated with another metal salt. Drying at lower temperature of 100° C. could help to maintain the tensile properties of the fiber treated with $(AlCl_3+NH_4OH)2\%$).

TABLE 17

Tensile Strength of Tows of Treated C2 Fibers

| | | Tensile Properties Max load (N) | |
|---|---|---|---|
| Fiber | Description | Parallel | Perpendicular |
| C2 | Untreated C2 | 20.4 ± 3.3 | 23.8 ± 4.1 |
| C2-1/P1 | C2 + $(Ba(OH)_2)2\%$ | 21.7 ± 3.2 | 24.1 ± 4.4 |
| C2-2/P1 | C2 + $(BaCl_2)2\%$ | 21.1 ± 3.1 | 25.1 ± 2.9 |

TABLE 17-continued

Tensile Strength of Tows of Treated C2 Fibers

| | | Tensile Properties Max load (N) | |
|---|---|---|---|
| Fiber | Description | Parallel | Perpendicular |
| C2-7/P1 | C2 + $Mg((OH)_2)2\%$ | 19.2 ± 3.4 | 23.6 ± 2.7 |
| C2-10/P1 | C2 + $(KOH)2\%$ | 15.8 ± 2.1 | 20.2 ± 2.9 |
| C2-11/P1 | C2 + $(NaOH)2\%$ | 15.8 ± 1.4 | 19.0 ± 2.6 |
| C2-13/P1 | C2 + $(NaOH)2\%$ then washed with water | 13.2 ± 1.9 | 18.4 ± 4.8 |
| C2-15/P1 | C2 + $(Al(OH)_3)2\%$ | 22.8 ± 1.8 | 23.6 ± 2.7 |
| C2-21/P1 | C2 + $(CaCl_2 + NaOH)2\%$ | 19.5 ± 3.4 | 24.9 ± 3.1 |
| C2-28/P1 | C2 + $(MgSO_4 + NaOH)2\%$ | 23.0 ± 3.6 | 25.8 ± 3.3 |
| C2-30/P1 | C2 + $(MgCl_2 + NaOH)2\%$ | 21.3 ± 3.2 | 23.7 ± 3.2 |
| C2-31/P2-2 | (C2 + NaOH) then add $CaCl_2$ | 23.0 ± 2.6 | 27.4 ± 3.9 |
| C2-32/P2-2 | (C2 + $CaCl_2$) then add NaOH | 22.4 ± 3.2 | 24.2 ± 3.4 |
| C2-34/P1 | C2 + $(AlCl_3 + NH_4OH)2\%$ | 16.9 ± 1.6 | 16.0 ± 1.5 |
| C2-34/P1 dry at 100° C. | C2 + $(AlCl_3 + NH_4OH)2\%$ dried at 100° C. | 24.1 ± 0.6 | 24.1 ± 5.9 |
| C2-40/P1 | C2 + $(Mg(NO_3)_2 + NaOH)2\%$ | 23.8 ± 3.5 | 25.5 ± 4.7 |
| C2-41/P1 | C2 + $(Ca(NO_3)_2 + NaOH)2\%$ | 24.4 ± 3.8 | 24.8 ± 3.9 |

EXAMPLE 9

Properties of Fire-Resistant Flax Fiber/Polymer Composites

Phenol Formaldehyde (PF)/Flax Fiber Composites

Phenol formaldehyde/flax fiber composites were prepared as indicated in Table 18 in accordance with the procedure described in Example 3. The resin (matrix) and fiber in composites are about 60% and 40% by weight, respectively. UL94 vertical burning tests were conducted in accordance with the procedure described in Example 4, and the results are shown in Table 18. Sample PF-C1 is a comparative example of a PF composite containing untreated flax fiber. PF-C1-1/P1 and PF-C1-3/P1 are comparative examples of PF composites containing flax fibers treated two different clays. PF-C1-11/P1 is an example of a PF composite of the present invention containing flax fibers treated with a bi-component barium-containing system. PF-C1-13/P2-1 is an example of a PF composite of the present invention containing flax fibers treated with a bi-component barium-containing system and then clay.

In this example, burning time is the time it takes for the sample to self-extinguish after the external flame is removed. Thus, a shorter burning time is indicative of a more fire resistant sample. Phenol formaldehyde is a phenolic thermoset resin which itself has considerable resistance to fire. Because of the fire resistance of phenol formaldehyde, it is the flax fiber that primarily burns during the burning test. As is evident from Table 18, fire-resistant flax fibers of the present invention provide a tremendously significant greater resistance to burning in the phenol formaldehyde matrix than untreated flax fibers or flax fibers treated just with clays. The fire-resistance effect is particularly pronounced when the flax fibers are treated with both an aqueous mixture of $BaCl_2$ and NaOH and an aqueous suspension of clay (PF-C1-13/P2-1).

TABLE 18

Phenol Formaldehyde/Flax Fiber Composites

| Sample | Composition | Burn Time (s) 5 inch length |
|---|---|---|
| PF-C1 | Phenol formaldehyde matrix Flax fabric C1 (untreated) | 118 |
| PF-C1-1/P1 | Phenol formaldehyde matrix Flax fabric C1-1/P1 (C1 + clay MMT2%) | 119 |
| PF-C1-3/P1 | Phenol formaldehyde matrix Flax fabric C1-3/P1 (C1 + clay LDH2%) | 101 |
| PF-C1-11/P1 | Phenol formaldehyde matrix Flax fabric C1-11/P1 (C1 + ($BaCl_2$ + NaOH)2%) | 74 |
| PF-C1-13/P2-1 | Phenol formaldehyde matrix Flax fabric C1-13/P2-1 (C1 + ($BaCl_2$ + NaOH)2% + clay MMT2%) | 10 |

Mechanical properties of the phenol formaldehyde/flax fiber composite samples are shown in Table 19. It is evident from Table 19 that PF composites containing fibers treated in accordance with the present invention have good mechanical properties. However, due to impregnation difficulties during the preparation of the composites, it is difficult to draw completely accurate conclusions about the mechanical properties of the samples listed in Table 19. Once the impregnation difficulties are resolved, the mechanical properties of composites containing fire-resistant fibers of the present invention are expected to improve.

TABLE 19

Mechanical Properties of Phenol Formaldehyde/Flax Fiber Composites

| Sample | Young Modulus (GPa) | Tensile Strength (MPa) | Strain at max load (%) | Energy to break point (J) | Density (g/cm$^3$) |
|---|---|---|---|---|---|
| PF-C1 | 9.20 (0.38) | 95.66 (10.59) | 2.90 (0.70) | 6.63 (2.17) | 1.563 (0.022) |
| PF-C1-1/P1 | 7.89 (0.27) | 70.81 (1.57) | 4.03 (0.23) | 8.45 (0.69) | 1.494 (0.005) |
| PF-C1-3/P1 | 10.46 (0.28) | 87.71 (4.64) | 1.88 (0.35) | 4.15 (1.08) | 1.442 (0.002) |
| PF-C1-11/P1 | 9.20 (1.98) | 77.36 (5.09) | 2.15 (0.52) | 4.33 (1.05) | 1.387 (0.001) |
| PF-C1-13/P2-1 | 6.25 (0.66) | 66.67 (1.42) | 3.22 (0.29) | 5.67 (0.64) | 1.473 (0.010) |

Phenol formaldehyde/flax fiber composites were prepared another time as indicated in Table 20 in accordance with the procedure described in Example 3. The resin (matrix) and fiber in composites are about 60% and 40% by weight, respectively. Vertical VC-2 burning tests were conducted in accordance with the procedure described in Example 4, and the results are shown in Table 20. Sample PF-C2 is a comparative example of a PF composite containing untreated flax fiber. PF-C2-34/P2-2% and PF-C2-34/P2-23% are examples of PF composites of the present invention containing flax fibers treated with a bi-component aluminum-containing system at 2 and 3%.

In this example, burning time is the time it takes for the sample to self-extinguish after the external flame is removed. Thus, a shorter burning time is indicative of a more fire resistant sample. Phenol formaldehyde is a phenolic thermoset resin which itself has considerable resistance to fire. Because of the fire resistance of phenol formaldehyde, it is the flax fiber that primarily burns during the burning test. As is evident from Table 20, fire-resistant flax fibers of the present invention provide a tremendously significant greater resistance to burning in the phenol formaldehyde matrix than untreated flax fibers that allows the obtained composites with the treated flax fibers to be classified as self-extinguished.

TABLE 20

Phenol Formaldehyde/Flax Fiber Composites

| Sample | Composition | Max flame time (s) | Max burn length (inches) | Glow | Pass VC-2 test |
|---|---|---|---|---|---|
| PF-C2 | Phenol formaldehyde matrix Flax fabric C2 (untreated) | 35.8 ± 8.2 | 1.3 ± 0.1 | No | No |
| PF-C2-34/P1-2% | Phenol formaldehyde matrix Flax fabric C2-34/P1-2% (C2 + (AlCl$_3$ + NH$_4$OH)2%) | 7.5 ± 5.6 | 0.5 ± 0.1 | No | Yes |
| PF-C2-34/P1-3% | Phenol formaldehyde matrix Flax fabric C2-34/P1-3% (C2 + (AlCl$_3$ + NH$_4$OH)3%) | 2.1 ± 2.4 | 0.2 ± 0.1 | No | Yes |

Mechanical properties of the phenol formaldehyde/flax fiber composite samples are shown in Table 21. It is evident from Table 21 that PF composites containing fibers treated with a bi-component aluminum-containing system at 2% in accordance with the present invention have comparable flexural properties with the reference. However, due to impregnation difficulties during the preparation of the composite containing fibers treated with a bi-component aluminum-containing system at 3%, the flexural strength of this sample reduced.

TABLE 21

Mechanical Properties of Phenol Formaldehyde/Flax Fiber Composites

| Sample | Composition | Flexural strength (MPa) | Flexural modulus (GPa) |
|---|---|---|---|
| PF-C2 | Phenol formaldehyde matrix Flax fabric C2 (untreated) | 129.8 ± 8.2 | 10.2 ± 0.3 |
| PF-C2-34/P1-2% | Phenol formaldehyde matrix Flax fabric C2-34/P1-2% (C2 + (AlCl$_3$ + NH$_4$OH)2%) | 118.1 ± 4.2 | 10.1 ± 0.8 |
| PF-C2-34/P1-3% | Phenol formaldehyde matrix Flax fabric C2-34/P1-3% (C2 + (AlCl$_3$ + NH$_4$OH)3%) | 65.9 ± 2.6 | 9.5 ± 0.3 |

Polypropylene (PP)/Flax Fiber Composites

Polypropylene/flax fiber composites were prepared as indicated in Table 22 in accordance with the procedure described in Example 3. The resin (matrix) and fiber in composites are about 60% and 40% by weight, respectively. Sample PP-C1 is a comparative example of a PP composite containing untreated flax fiber. PP-C1-3/P1 is a comparative example of PP composite containing flax fibers treated only with LDH clay. PP-C1-6/P1 is a comparative example of a PP composite containing flax fibers treated only with Ba(OH)$_2$. PP-C1-10/P2-1 is a comparative example of a PP composite containing flax fibers treated with Ba(OH)$_2$ and then LDH clay. PP-C1-11/P1 is an example of a PP composite of the present invention containing flax fibers treated with a bi-component barium-containing system. PP-C1-13/P2-1 is an example of a PP composite of the present invention containing flax fibers treated with a bi-component barium-containing system and then MMT clay. PP-C1-14/P2-1 is an example of a PP composite of the present invention containing flax fibers treated with a bi-component barium-containing system and then LDH clay. Horizontal burning tests were conducted in accordance with the procedure described in Example 4, and the results are shown in Table 23. Burning time represents the amount of time it took for the sample to burn the stated length. Thus, a longer time to burn a given length is an indication of better fire resistance. It is evident from Table 23 that the fire-resistant flax fibers of the present invention have less effect on the fire resistance of a polypropylene composite as compared to a phenol formaldehyde composite (see Table 18). This is likely due to the fact that polypropylene itself is highly flammable, thus the matrix burns in any event. However, the inclusion of clay in the polypropylene/flax fiber composite of the present invention does offer a marked improvement over composites having fire-resistant flax fibers of the present invention but not including clay, and over composites having clay and regular flax fibers.

TABLE 22

Composition of Polypropylene/Flax Fiber Composites

| Sample | Composition |
|---|---|
| PP-C1 | Polypropylene matrix<br>Flax fabric C1 (untreated) |
| PP-C1-3/P1 | Polypropylene matrix<br>Flax fabric C1-3/P1 (C1 + clay LDH2%) |
| PP-C1-6/P1 | Polypropylene matrix<br>Flax fabric C1-6/P1 (C1 + Ba(OH)$_2$2%) |
| PP-C1-10/P2-1 | Polypropylene matrix<br>Flax fabric C1-10/P2-1 (C1 + Ba(OH)$_2$2% + clayLDH2%) |
| PP-C1-11/P1 | Polypropylene matrix<br>Flax fabric C1-11/P1 (C1 + (BaCl$_2$ + NaOH)2%) |
| PP-C1-13/P2-1 | Polypropylene matrix<br>Flax fabric C1-13/P2-1 (C1 + (BaCl$_2$ + NaOH)2% + clay MMT2%) |
| PP-C1-14/P2-1 | Polypropylene matrix<br>Flax fabric C1-13/P2-1 (C1 + (BaCl$_2$ + NaOH)2% + clay LDH2%) |

TABLE 23

Burning Tests on Polypropylene/Flax Fiber Composites

| | Burning length (inches) | | | | | |
|---|---|---|---|---|---|---|
| | 0.0 | 1.0 | 2.0 | 3.0 | 4.0 | 5.0 |
| Sample | Burning Time (seconds) | | | | | |
| PP-C1 | 0 | 103 | 186 | 263 | 344 | 382 |
| PP-C1-3/P1 | 0 | 112 | 190 | 270 | 351 | 399 |
| PP-C1-6/P1 | 0 | 117 | 186 | 255 | 332 | 370 |
| PP-C1-10/P2-1 | 0 | 108 | 174 | 246 | 322 | 365 |
| PP-C1-11/P1 | 0 | 103 | 182 | 268 | 351 | 369 |
| PP-C1-13/P2-1 | 0 | 125 | 201 | 276 | 352 | 386 |
| PP-C1-14/P2-1 | 0 | 147 | 230 | 313 | 409 | 446 |

Figure 1B:
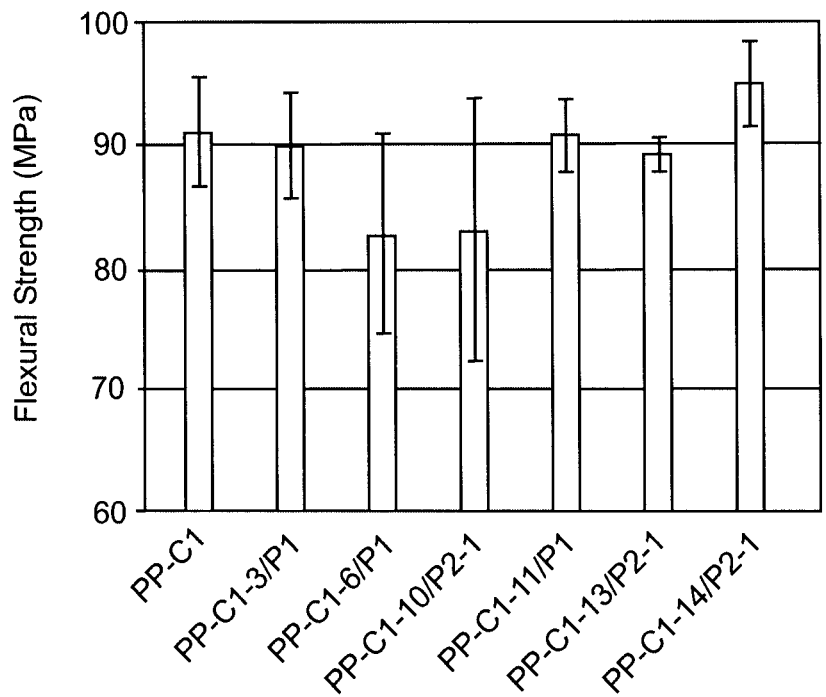

Mechanical properties of the polypropylene/flax fiber composite samples are shown in FIG. 1A (flexural modulus) and FIG. 1B (flexural strength). It is evident from FIG. 1A and FIG. 1B that polypropylene composites containing flax fibers treated in accordance with the present invention have significantly better flexural modulus than the comparative samples, while maintaining a flexural strength that is at least as good as the comparative samples.

Epoxy/Flax Fiber Composites

Epoxy/flax fiber composites were prepared as indicated in Table 24 in accordance with the procedure described in Example 3. The resin (matrix) and fiber in composites are about 60% and 40% by weight, respectively. Sample Epo-C2 is a comparative example of an epoxy composite containing untreated flax fiber. Epo-C2-34/P1 is a comparative example of epoxy composite containing flax fibers treated only with a bi-component aluminum-containing system at 2%. Epo-C2-

34-Clay/P2 is a comparative example of epoxy composite containing flax fibers treated only with a bi-component aluminum-containing system at 2% and then MMT clay. Horizontal burning tests were conducted in accordance with the procedure described in Example 4, and the results are shown in Table 25. Burning time represents the amount of time it took for the sample to burn the stated length. Thus, a longer time to burn a given length is an indication of better fire resistance. It is evident from Table 25 that the fire-resistant flax fibers of the present invention have stopped the composites from burning. Mechanical properties of the epoxy/flax fiber composite samples are shown in Table 26. It is evident from Table 26 that epoxy composites containing flax fibers treated in accordance with the present invention have very slightly reduction in tensile strength and modulus than the comparative samples, while improving the energy to break which represents the composite toughness.

TABLE 24

Composition of Epoxy/Flax Fiber Composites

| Sample | Composition |
| --- | --- |
| Epo-C2 | Epoxy matrix<br>Flax fabric C2 (untreated) |
| Epo-C2-34/P1 | Epoxy matrix<br>Flax fabric C2-34/P1 (C2 + (AlCl$_3$ + NH$_4$OH)2%) |
| Epo-C2-34-Clay/P2 | Epoxy matrix<br>Flax fabric C2-34/P1 (C2 + (AlCl$_3$ + NH$_4$OH)2% + clay MMT2%)) |

TABLE 25

Burning Tests on Epoxy/Flax Fiber Composites

| | Burning length (inches) | | | | | |
| --- | --- | --- | --- | --- | --- | --- |
| | 0.0 | 1.0 | 2.0 | 3.0 | 4.0 | 5.0 |
| Sample | Burning Time (seconds) | | | | | |
| Epo-C2 | 0 | 111 | — | — | 425 | 542 |
| Epo-C2-34/P1 | 0 | NB | NB | NB | NB | NB |
| Epo-C2-34-Clay/P2 | 0 | NB | NB | NB | NB | NB |

TABLE 26

Mechanical Properties of Epoxy/Fax Fiber Composites

| Sample | Tensile stress (MPa) | Tensile modulus (GPa) | Energy to break (J) |
| --- | --- | --- | --- |
| EPO-C2 | 117.7 ± 4.0 | 9.8 ± 0.6 | 33.7 ± 2.0 |
| Epo-C2-34/P1 | 106.4 ± 1.0 | 7.2 ± 0.3 | 36.7 ± 2.6 |
| Epo-C2-34-Clay/P2 | 103.7 ± 4.2 | 8.4 ± 0.2 | 36.7 ± 2.6 |

Unsaturated Polyester/Flax Fiber Composites

UPE/flax fiber composites were prepared as indicated in Table 27 in accordance with the procedure described in Example 3. The resin (matrix) and fiber in composites are about 70% and 30% by weight, respectively. Sample UPE-C2 is a comparative example of an epoxy composite containing untreated flax fiber. UPE-C2-34/P1 is a comparative example of epoxy composite containing flax fibers treated only with a bi-component aluminum-containing system at 2%. Horizontal burning tests were conducted in accordance with the procedure described in Example 4, and the results are shown in Table 28. Burning time represents the amount of time it took for the sample to burn the stated length. Thus, a longer time to burn a given length is an indication of better fire resistance. It is evident from Table 28 that the fire-resistant flax fibers of the present invention have stopped the composites from burning.

TABLE 27

Composition of UPE/Flax Fiber Composites

| Sample | Composition |
| --- | --- |
| UPE-C2 | UPE matrix<br>Flax fabric C2 (untreated) |
| UPE-C2-34/P1 | UPE matrix<br>Flax fabric C2-34/P1 (C2 + (AlCl$_3$ + NH$_4$OH)2%) |

TABLE 28

Burning Tests on UPE/Flax Fiber Composites

| | Burning length (inches) | | | | | |
| --- | --- | --- | --- | --- | --- | --- |
| | 0.0 | 1.0 | 2.0 | 3.0 | 4.0 | 5.0 |
| Sample | Burning Time (seconds) | | | | | |
| UPE-C2 | 0 | 114 | — | — | 421 | 522 |
| UPE-C2-34/P1 | 0 | NB | NB | NB | NB | NB |

References: The contents of the entirety of each of which are incorporated by this reference.

Charrier J-M. (1991) *Polymeric Materials Processing: Plastics, Elastomers and Composites*. (Carl Hanser Verlag).

Chen Y, Frendi A, Tewari S, Sibulkin M. (1991) Combustion Properties of Pure and Fire-Retarded Cellulose. *Combustion and Flame*. 84, 121-140.

de Lissa RCF, Schwarze W G. (1976) Flame-Proof Cellulosic Product. U.S. Pat. No. 3,973,074 issued Aug. 3, 1976.

Ebrahimian S, Jozokos M A. (2002) Zero Halogen Polyolefin Composition. Great Britain Patent Publication 2367064 published Mar. 27, 2002.

Fukuba K, Miyazaki M. (1977) Flame-Resistant Plaster Board and Its Manufacture. U.S. Pat. No. 4,064,317 issued Dec. 20, 1977.

Gordon I. (1901) Composition for Fireproofing Paper. U.S. Pat. No. 671,548 issued Apr. 9, 1901.

Herndon J F, Morgan D J. (1994) Flame Retardant Composition and Method for Treating Wood. Canadian Patent Publication 2,079,302 published Mar. 29, 1994.

Manas-Zloczower I, Tadmor Z. (1994) *Mixing and Compounding of Polymers*. (Carl Hanser Verlag).

Mostashari S M. (2004-2005) The Impartation of Flame-Retardancy to Cotton Fabric by the Application of Selected Carbonates of Group II. *J. Applied Fire Science*. 13(1), 1-8.

Mostashari S M, Kamali Nia Y, Fayyaz F. (2008) Thermogravimetry of Deposited Caustic Soda Used as a Flame-Retardant for Cotton Fabric. *Journal of Thermal Analysis and Calorimetry*. 91(1), 237-241.

Musselman L L, Greene H L. (1996) Materials for Use as Fire Retardant Additives. U.S. Pat. No. 5,480,587 issued Jan. 2, 1996.

Nishibori S, Komori H, Saeki S, Kinoshita H. (1986) Flame Retarder for Organic High Molecular Compounds Prepared from Polycondensates of Halogenated Phenols. U.S. Pat. No. 4,567,242 issued Jan. 28, 1986.

Ohkoshi M, Okazaki H, Hoshio T, Yasuno M. (2008) Photopolymerizable Composition and Flame-Retardant Resin-Formed Article. U.S. Pat. No. 7,354,958 issued Apr. 8, 2008.

Rauwendaal C. (1998) *Polymer Mixing*. (Carl Hanser Verlag).

Rock M. (2009) Flame Retardant Fabrics. United States Patent Publication 2009-298370 published Dec. 3, 2009.

Seietsu K. (2002) Method for Producing Flame-Retardant of Nonfusible Fiber. Japanese Patent Publication 2002-180374 published Jun. 26, 2002.

Underwriters Laboratories Inc. (2010) UL 94, the Standard for Safety of Flammability of Plastic Materials for Parts in Devices and Appliances testing.

Yan X B. (2006) Preparation Method of Hydrophobic Ultrafine Nanometer Fire Retardant Magnesium Hydroxide. Abstract of Chinese Patent Publication 1869154 published Nov. 29, 2006.

Yoshifumi N, Tadao Y, Yuji T, Yoichi N. (2003) Crosslinked Phenoxyphosphazene Compounds, Flame Retardants, Flame-Retardant Resin Compositions, and Moldings of Flame-Retardant Resins. United States Patent Publication 2003-0220515 published Nov. 27, 2003.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

What is claimed is:

1. A process of producing a fire-resistant cellulosic material comprising:
   treating a cellulosic material with an aqueous reaction mixture of an alkali metal or ammonium hydroxide and an alkaline earth or aluminum metal salt, wherein the treating is done simultaneously with or in 1 day or less of mixing the alkali metal or ammonium hydroxide and alkaline earth or aluminum metal salt; and, drying the treated cellulosic material.

2. The process according to claim 1, wherein the alkaline earth or aluminum metal salt comprises alkaline earth metal salt.

3. The process according to claim 2, wherein the alkaline earth metal salt comprises magnesium or calcium.

4. The process according to claim 2, wherein the alkaline earth metal salt is a chloride, a fluoride, a bromide, an iodide or a nitrate.

5. The process according to claim 2, wherein the alkaline earth metal salt is calcium or magnesium chloride.

6. The process according to claim 1, wherein the alkaline earth or aluminum metal salt comprises aluminum chloride.

7. The process according to claim 1, wherein the hydroxide is selected from the group consisting of: an alkali metal hydroxide, NaOH, or $NH_4OH$.

8. The process according to claim 1, wherein the hydroxide is $NH_4OH$ and the metal salt is $AlCl_3$.

9. The process according to claim 1, wherein the aqueous reaction mixture utilizes 0.5-10 wt % of the alkaline earth or aluminum metal salt and 0.5-4 wt % of the alkali metal or ammonium hydroxide, and wherein a product of the reaction of the alkaline earth or aluminum metal salt and the alkali metal or ammonium hydroxide is present in an amount of 0.5 wt % or more.

10. The process according to claim 1, wherein the short period of time is 5 seconds to 5 hours, 5 seconds to 30 minutes, 5 seconds to 10 minutes, or 1 minute to 5 hours.

11. The process according to claim 1, wherein the cellulosic material comprises material from wood sources, agricultural sources, synthetic sources, recycled paper or recycled cardboard.

12. The process according to claim 1, wherein the cellulosic material is further treated with a layered nanoparticulate material before, at the same time or after treating with the aqueous reaction mixture.

13. The process according to claim 12, wherein treating with the layered nanoparticulate material is done after treating with the aqueous reaction mixture.

14. The process according to claim 12, wherein the layered nanoparticulate material comprises one of the following: a layered clay; a layered double hydroxide, montmorillonite, sepiolite, palygorskite, bentonite, fluoromica or a mixture thereof; or a layered double hydroxide, montmorillonite or a mixture thereof.

15. A fire-resistant cellulosic material produced by the process as defined in claim 1.

16. The fire-resistant cellulosic material according to claim 15 which is self-extinguishing.

17. A polymer composite comprising a polymer matrix and the fire-resistant cellulosic material as defined in claim 15 dispersed in the polymer matrix.

18. The polymer composite according to claim 17, wherein the polymer matrix comprises an organic polymer, a thermoset resin; a polyolefin or a phenolic resin; polypropylene or a phenol formaldehyde; or unsaturated polyester or an epoxy polymer.

19. The polymer composite according to claim 17 further comprising a surfactant for improving compatibility of the fire-resistant cellulosic material with the polymer matrix.

20. The polymer composite according to claim 19, wherein the surfactant comprises an amine, a di-functional amine, a poly-functional amine, an alkanolamine, an acid, a carboxylate or any mixture thereof.

21. The polymer composite according to claim 17, wherein the polymer matrix is present in an amount from about 0.1 to about 99.9 weight percent or from about 40 to about 98 weight percent based on total weight of the polymer composite.

* * * * *